United States Patent [19]

Brooks et al.

[11] Patent Number: 4,758,966
[45] Date of Patent: Jul. 19, 1988

[54] THERMAL PRINTING APPARATUS AND METHOD

[75] Inventors: Ralf M. Brooks, Waterloo; Brian P. Connell, Elmira, both of Canada

[73] Assignee: NCR Canada Ltd. - NCR Canada LTEE, Mississauga, Canada

[21] Appl. No.: 859,515

[22] Filed: May 5, 1986

[51] Int. Cl.⁴ .................. G01D 15/10; B41J 3/20; G06F 15/62

[52] U.S. Cl. .................. 364/519; 219/216; 346/76 PH; 400/120

[58] Field of Search .................. 219/216; 346/76 PH; 364/519; 400/120

[56] References Cited

U.S. PATENT DOCUMENTS

| | | | |
|---|---|---|---|
| 3,577,137 | 5/1971 | Brennan, Jr. | 340/324 |
| 3,964,388 | 6/1976 | Maxwell | 101/426 |
| 4,113,391 | 9/1978 | Minowa | 400/120 |
| 4,149,171 | 4/1979 | Sato et al. | 346/76 PH X |
| 4,262,188 | 4/1981 | Beach | 219/216 |
| 4,284,876 | 8/1981 | Ishibashi et al. | 219/216 |
| 4,305,080 | 12/1981 | Cunningham et al. | 346/76 PH |
| 4,330,786 | 5/1982 | Hatabe et al. | 346/76 PH |
| 4,347,518 | 8/1982 | Williams et al. | 346/1.1 |
| 4,391,535 | 7/1983 | Palmer | 400/120 |
| 4,415,907 | 11/1983 | Suemori | 346/76 PH |
| 4,434,354 | 2/1984 | Nakata | 219/216 |
| 4,442,342 | 4/1984 | Yoneda | 219/216 |
| 4,449,033 | 5/1984 | McClure et al. | 219/216 |
| 4,510,505 | 4/1985 | Fukui | 346/76 PH |
| 4,523,203 | 6/1985 | Adkisson et al. | 346/76 PH |
| 4,532,523 | 7/1985 | Tanaka | 346/76 PH |
| 4,535,340 | 8/1985 | Moriguchi et al. | 346/76 PH |
| 4,542,281 | 9/1985 | Thompson | 219/216 |
| 4,547,784 | 10/1985 | Erlichman et al. | 346/76 PH |
| 4,563,691 | 1/1986 | Noguchi et al. | 346/76 PH |
| 4,563,693 | 1/1986 | Masaki | 400/120 X |
| 4,573,058 | 2/1986 | Brooks | 346/76 PH |
| 4,574,293 | 3/1986 | Inui et al. | 364/519 |
| 4,595,935 | 6/1986 | Brooks et al. | 346/76 PH |
| 4,625,216 | 11/1986 | Brooks et al. | 400/120 X |
| 4,627,004 | 12/1986 | Cool et al. | 364/521 |
| 4,630,068 | 12/1986 | Ims | 400/120 X |
| 4,649,400 | 3/1987 | Naruki et al. | 346/76 PH |

OTHER PUBLICATIONS

Article entitled "High Speed Thermal Printing Head and its Temperature Control", by Mamoru Mizuguchi et al. of Toshiba Corp., in Advances In Non-Impact Printing Technologies for Computer & Office Applications, Edited by J. Gaynon for Van Nostrand Reimhold Co.-pp. 857-873.

Article entitled "High-Speed Thermal Recording", by Katsuhisa Saito, Kazuo Nakano, Keiji Murasugi and Toshiyuki Iwabuchi of OKI Electric Industry Co., Ltd.-Research Laboratory, Tokyo, Japan-Proceedings of the SID, vol. 21/2, 1980, pp. 165-169.

Article entitled "Gray-Scale Thermal Recording", by Shigehisa Nakaya, Katsuhisa Saito & Kazuo Nakano-OKI Electric Industry Co., Ltd., Research Lab., Tokyo, Japan-Proceedings of the SID, vol. 21/2, 1980-pp. 171-175.

Article entitled "New Gray-Scale Printing Method Using A Thermal Printer", by Yukio Tokunaga, Kazunari Kubota and Jun Ohya-IEEE Transactions on Electron Devices, vol. ED-30, No. 8, Aug. 1983-pp. 898-904.

Primary Examiner—Parshotam S. Lall
Assistant Examiner—Edward R. Cosimano
Attorney, Agent, or Firm—Wilbert Hawk, Jr.; Albert L. Sessler, Jr.

[57] ABSTRACT

A thermal printing apparatus and method are disclosed which allows a plurality of thermal print head elements to remain concurrently active, with each individual element being capable of remaining active for a time duration unique to itself and independent of burn times required by the remaining elements. This individual element burn time control is obtained by the high-speed loading and reloading of the thermal print head shift register, with the contents of the individual shift register cells being the controlling factor. Once the thermal print head element resistances have been dynamically measured, specific energies are derived for each element in the printhead by modulating the on time for each element, thus allowing grey scale printing and the like.

29 Claims, 26 Drawing Sheets

FIG. 19

TABLE 2

| PRINT HEAD ELEMENT # | MEASURED RESISTANCE BLOCK 170 | CORRECTED RESISTANCE BLOCK 171 | REQUIRED BURN TIME (msec) BLOCK 172 | REQUIRED BURN INCREMENT COUNTS BLOCK 173 |
|---|---|---|---|---|
| 23 | 291 | 285 | 1.38 | 19 |
| 105 | 306 | 300 | 1.81 | 25 |
| 147 | 318 | 312 | 1.76 | 25 |
| 207 | 312 | 306 | 1.98 | 28 |
| 290 | 297 | 291 | 1.17 | 16 |

FIG. 20

TABLE 3

SELECTED BURN TIME TABLE RAM CONTENTS

| BURN TIME TABLE MEMORY POSITION CORRESPONDING TO ELEMENT # | MEMORY CONTENTS AT ENTRANCE 230 | MEMORY CONTENTS AT ENTRANCE 272 FOR FIRST PASS |
|---|---|---|
| 1 | 0 | 0 |
| 2 | 0 | 0 |
| ⋮ | ⋮ | ⋮ |
| 22 | 0 | 0 |
| 23 | 19 | 18 |
| 24 | 0 | 0 |
| ⋮ | ⋮ | ⋮ |
| 104 | 0 | 0 |
| 105 | 25 | 24 |
| 106 | 0 | 0 |
| ⋮ | ⋮ | ⋮ |
| 147 | 25 | 24 |
| ⋮ | ⋮ | ⋮ |
| 207 | 28 | 27 |
| ⋮ | ⋮ | ⋮ |
| 290 | 16 | 15 |
| ⋮ | ⋮ | ⋮ |
| 320 | 0 | 0 |

FIG. 21

TABLE 4
BIT MATRIX

| BIT POSITION WITHIN A ROW | ROW 1– ROW 16 | ROW 17– ROW 19 | ROW 20– ROW 25 | ROW 26– ROW 28 | ROW 29 |
|---|---|---|---|---|---|
| 1 | 0 | 0 | 0 | 0 | 0 |
| 2 | 0 | 0 | 0 | 0 | 0 |
| ⋮ | ⋮ | ⋮ | ⋮ | ⋮ | ⋮ |
| 22 | 0 | 0 | 0 | 0 | 0 |
| 23 | 1 | 1 | 0 | 0 | 0 |
| 24 | 0 | 0 | 0 | 0 | 0 |
| ⋮ | ⋮ | ⋮ | ⋮ | ⋮ | ⋮ |
| 104 | 0 | 0 | 0 | 0 | 0 |
| 105 | 1 | 1 | 1 | 0 | 0 |
| 106 | 0 | 0 | 0 | 0 | 0 |
| ⋮ | ⋮ | ⋮ | ⋮ | ⋮ | ⋮ |
| 146 | 0 | 0 | 0 | 0 | 0 |
| 147 | 1 | 1 | 1 | 0 | 0 |
| 148 | 0 | 0 | 0 | 0 | 0 |
| ⋮ | ⋮ | ⋮ | ⋮ | ⋮ | ⋮ |
| 206 | 0 | 0 | 0 | 0 | 0 |
| 207 | 1 | 1 | 1 | 1 | 0 |
| 208 | 0 | 0 | 0 | 0 | 0 |
| ⋮ | ⋮ | ⋮ | ⋮ | ⋮ | ⋮ |
| 289 | 0 | 0 | 0 | 0 | 0 |
| 290 | 1 | 0 | 0 | 0 | 0 |
| 291 | 0 | 0 | 0 | 0 | 0 |
| ⋮ | ⋮ | ⋮ | ⋮ | ⋮ | ⋮ |
| 320 | 0 | 0 | 0 | 0 | 0 |

THERMAL PRINTING APPARATUS AND METHOD

BACKGROUND OF THE INVENTION

Thermal printing, which embodies the use of heat to produce markings on record media, either by selective direct heatings of the record media or by heating of an ink-containing medium such as a thermal transfer ribbon, is widely used for certain printing applications, such as those in which lack of noise is important. One type of thermal print head comprises one or more, usually a plurality, of resistor elements on a ceramic or glass substrate. Passage of an electric current through the resistor elements for a controlled period of time causes the elements to heat, thus providing energy for printing.

It is well known that the manufacturing process for fabricating resistors on ceramic or glass substrates, such as is done for thermal print heads, results in a certain range of resistance values. For new unused thermal print heads, a typical resistance tolerance range might be plus or minus fifteen percent within a single print head having multiple resistor elements. For example, if the average resistance of a thermal print head is 300 ohms, the maximum element resistance contained therein might be 345 ohms, and the minimum resistance might be 255 ohms. For a new thermal print head, it is generally found that resistances are distributed about some average in a Gaussian distribution.

It is also known that the absolute value of a specific resistance element within a thermal print head is not constant throughout the operating life of the print head, but changes with time. The degree of resistance change of an element is dependent upon the amount of use of the print head, the amount of energy applied to the element each time, and the physical properties of the element. Thus the resistance for each element within the print head may change in a unique, independent manner, so that the initial Gaussian distribution of resistance of individual thermal elements is not maintained throughout the operating life of the print head.

The printing problem which results from the foregoing becomes readily apparent from the equation which relates energy input to a thermal print head element with respect to the actual resistance of the element, namely:

$$E = \frac{V^2}{R} T$$

where

E equals the resultant energy input to the thermal print head element, expressed in millijoules;

V equals the voltage which is applied across all resistance elements;

R equals resistance in ohms;

T equals the burn time, or duration of time that electrical current flow is maintained, expressed in milliseconds.

The printing problem arises from the fact that since V and T are constant, it is impossible to obtain an identical energy pulse for all elements of the thermal print head since there is such a wide distribution of resistances. Thus for control over optical print density or to obtain uniformity of printing, it is necessary to have control over the energy which is dissipated in each and every element within the thermal print head. Such control would also enable the printing of a controlled shade of coloration, as for example, variations in a grey scale.

U.S. patent application Ser. No. 737,836, filed May 24, 1985, now U.S. Pat. No. 4,573,058, issued Feb. 25, 1986, inventor Ralf M. Brooks, assigned to the assignee of the present application, discloses means for measuring the resistance of individual thermal elements of a thermal print head. U.S. patent application Ser. Nos. 640,894, filed Aug. 14, 1984, inventors Ralf M. Brooks, et al., now U.S. Pat. No. 4,595,935, issued June 17, 1986, and 762,737, filed Aug. 5, 1985, inventors Ralf M. Brooks et al., now U.S. Pat. No. 4,625,216, issued Nov. 25, 1986, both assigned to the assignee of the present application, are also directed to thermal printing apparatus.

SUMMARY OF THE INVENTION

The present invention relates to thermal printing means, and more particularly relates to thermal printing means in which the resistance of each element of a thermal print head is measured and the burn time for each element is modulated accordingly, to produce a unique controlled energy for each element within the print head.

In accordance with one embodiment of the invention, thermal printing apparatus comprises thermal print head means including a plurality of thermal elements and circuit means for applying required energy to and controlling the individual operation of said elements; means connected with said thermal print head means for providing a head voltage value thereto; means connected with said thermal print head means for measuring the resistance of each individual thermal element and providing a digital value representing each such resistance; data input means for selection of individual thermal elements to be energized; processing means for computing individual thermal element burn duration values in accordance with which elements are selected by the data input means, and also in accordance with the measured digital resistance values of each such element taken from said measuring means, the required energy and the head voltage value; storage means for storing the computed individual element burn duration values for said elements; parallel-to-serial shift register means for receiving data in parallel form from said storage means under control of said processing means relating to which elements are to be energized and for what duration, and for providing said data in serial form to said circuit means of said thermal print head means for selection and timed operation of said thermal elements; interface circuitry means for providing operating signals to said thermal print head means; and bus means interconnecting said measuring means, said data input means, said processing means, said storage means, said interface circuitry means and said parallel-to-serial means for communications.

In accordance with another embodiment of the invention, a method of thermal recording, said method utilizing a thermal print head including a plurality of individual thermal elements and operating circuitry for applying required energy and causing energization of said elements, comprises the steps of determining the resistance of each individual thermal element; determining the common applied voltage to said thermal elements; determining from said resistance, said required energy and said common applied voltage the length of time, hereinafter referred to as burn time that each individual thermal element must be energized in order to produce a record having markings of desired shades; storing the individual burn time information for each thermal element in a storage means; transferring the individual burn time information from said storage means to said operating circuitry of said thermal print head; and causing the operation of said thermal print head, whereby said thermal elements are energized for various durations in accordance with their individual resistances, said required energy and said common applied voltage.

It is accordingly an object of the present invention to provide thermal printing apparatus in which each thermal element is capable of recording in a uniform shade or optical density.

Another object is to provide thermal printing apparatus capable of varying the shade of the marks produced.

Another object is to provide thermal printing apparatus in which the energy applied to each individual thermal printing element can be varied in accordance with its measured individual resistance and applied print head voltage.

Another object is to provide a method of thermal printing in which each thermal element is capable of recording in a uniform shade.

Another object is to provide a method of thermal printing in which the resistance of each thermal element is measured individually and energy is applied to that element in accordance with said resistance in order to produce a uniform shade of recording.

Another object is to provide a method of thermal recording in which the shade of the marks produced may be varied.

With these and other objects, which will become apparent from the following description, in view, the invention includes certain novel features of construction and combinations of parts, a plurality of forms or embodiments of which are hereinafter described with reference to the drawings which accompany and form a part of this specification.

BRIEF DESCRIPTION OF THE DRAWINGS

FIGS. 19, 20 and 21 depict TABLES 2, 3 and 4, referred to in the specification.

DETAILED DESCRIPTION OF THE PREFERRED EMBODIMENT

Figure 1:
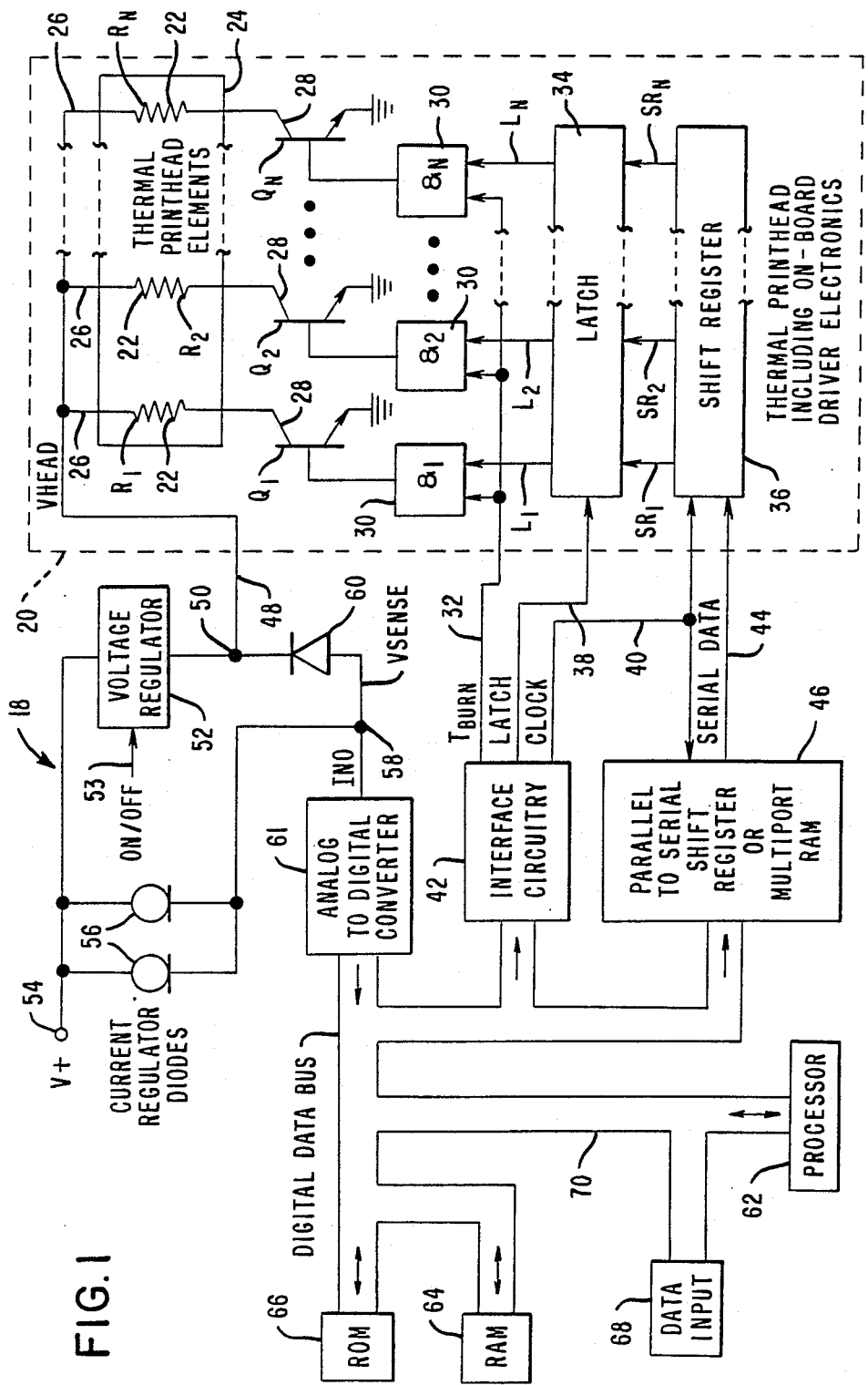
FIG. 1 is a block diagram of one embodiment of the present invention.

Shown in FIG. 1 is a block diagram of a system 18 which comprises an illustrative embodiment of the present invention. A thermal print head, represented by the dashed-line block 20, includes a plurality of resistive thermal elements 22, also designated $R_1$-$R_N$ in FIG. 1 and $R_3$-$R_N$ in FIG. 2B, which are deposited or otherwise placed in line upon a ceramic or other substrate, represented by the block 24. Each element 22 is coupled at a first end to a conductor 26, and at its other end is coupled to the collector of a transistor 28, also designated $Q_1$-$Q_N$, the emitter of which is grounded, and the base of which is coupled to the output of an AND gate 30. These transistors $Q_1$-$Q_N$ are selectively turned on by high or 1 state signals applied to their bases in order to ground preselected ones of the lower terminals of associated ones of the elements $R_1$-$R_N$ in FIG. 1 and $R_3$-$R_N$ in FIG. 2B to print thermally a line of information. Each of the transistors $Q_1$-$Q_N$ that is turned on allows current to flow through its associated one of the thermal resistive elements $R_1$-$R_N$ in FIG. 1 and $R_3$-$R_N$ in FIG. 2B, for the length of time that the high or one state remains at the transistor base. The resulting energy causes heat transfer to either a donor thermal transfer ribbon (not shown) to effect ink transfer to plain paper or causes a recipient thermal paper (not shown), when used, to develop.

A first input of the AND gate 30 is coupled to a TBURN line 32, and a second input of said AND gate 30 is coupled to one stage of a latch 34. Each stage of the latch 34 is, in turn, coupled to a corresponding stage of a shift register 36. A LATCH line 38 is applied to the latch 34, and a CLOCK line 40 is applied to the shift register 36. Signals on these lines are provided by interface circuitry 42, which will subsequently be described in greater detail. In addition, a SERIAL DATA line 44 is also applied to the shift register 36 from a parallel-toserial shift register 46, to shift a stream of serial data of N (binary) bits in length into said register, as will subsequently be described in greater detail.

One end of each element 22 is coupled by the conductor 26 to a VHEAD line 48, which is coupled through a node 50, to a voltage regulator 52, which can be switched on or off by a signal from a processor 62 applied to an ON-OFF line 53. From the voltage regulator 52, a path extends to a V+ terminal 54 to which a suitable source of potential is applied. A second circuit path extends from the V+ terminal 54 through a pair of current regulating diodes 56, a node 58 and a diode 60, which may be a germanium diode, to the node 50. The diodes 56 may be 1N5314 field effect current regulator diodes manufactured by Motorola, Inc., Phoenix, Ariz., with each diode regulating a nominal constant current of 5 milliamperes, so that the combination can regulate a total constant current of 10 ma. The node 58 is also connected to the input IN0 of an analog-to-digital converter 61, as will subsequently be discussed in greater detail.

Figure 2A:
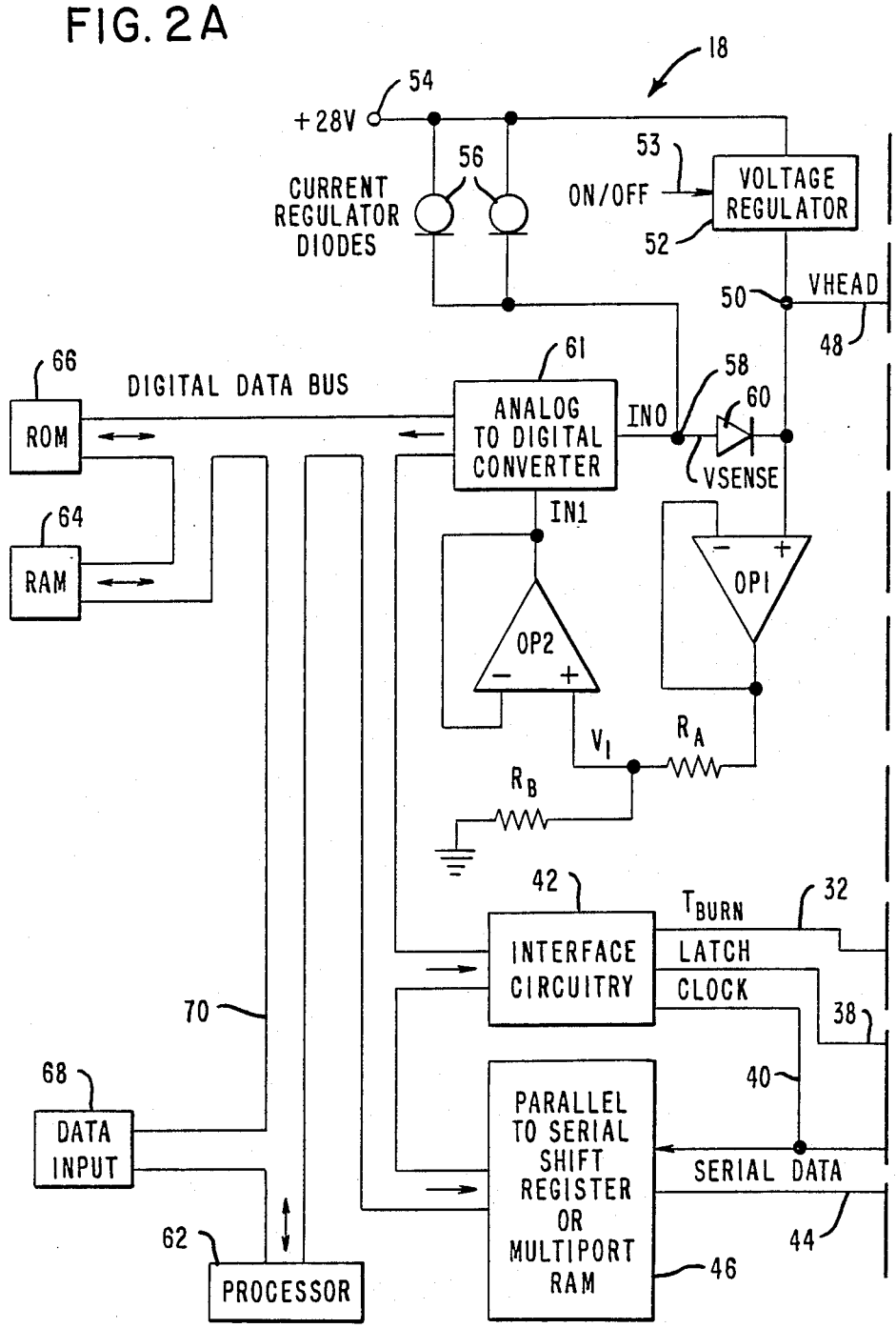
FIGS. 2A and 2B, taken together, comprise a block diagram of a second embodiment of the present invention.
Figure 2B:
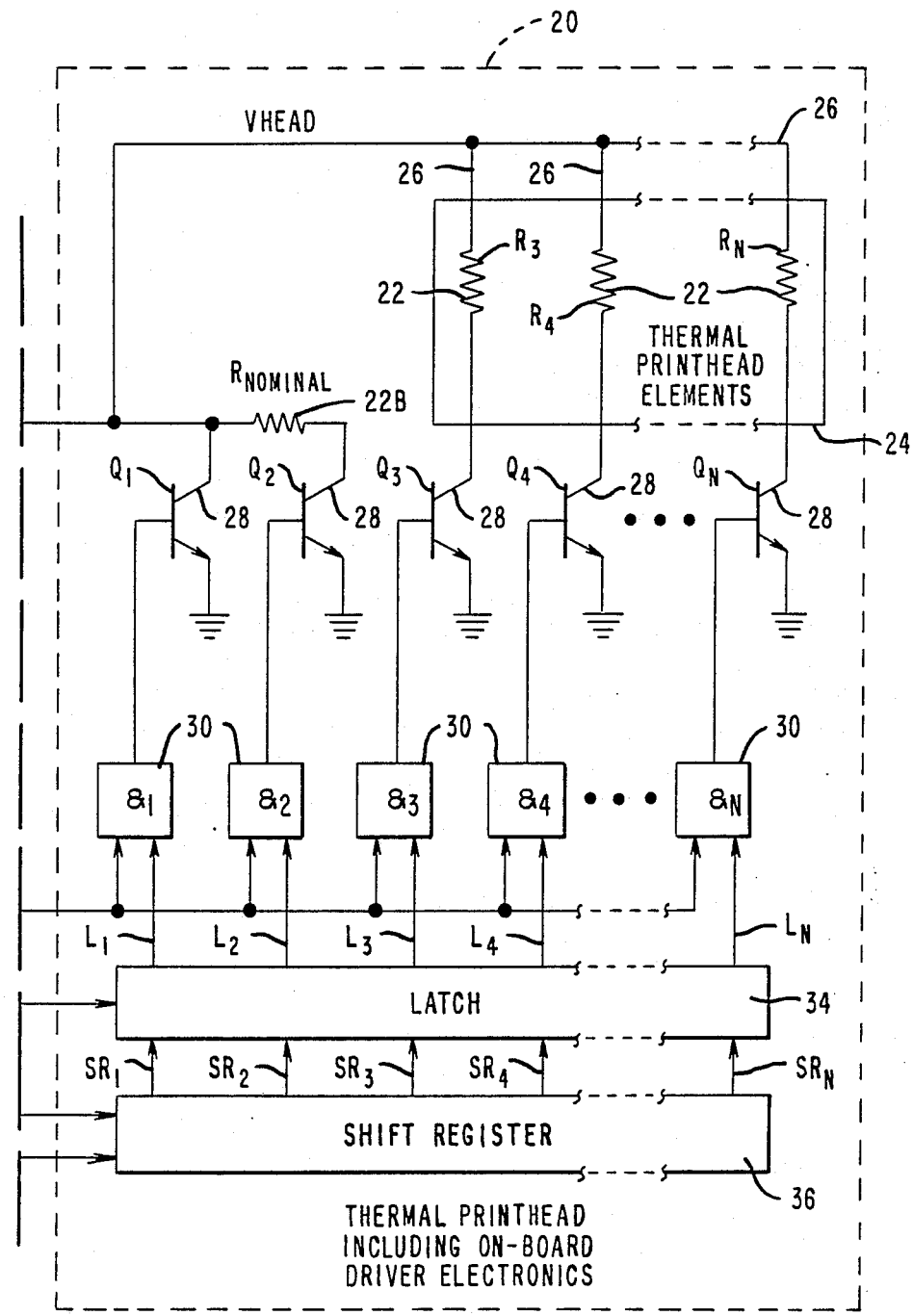

In addition to the above, in the alternative embodiment of FIGS. 2A and 2B, the node 50 is connected to the plus input of operational amplifier OP1 configured in a unity gain voltage follower configuration to provide effective isolation between the voltage regulator 52 output and the resistor network which is connected to the output of amplifier OP1. The output of amplifier OP1 is connected to one lead of a precision resistor $R_A$. The other lead of $R_A$ is connected to one lead of precision resistor $R_B$ and also to the plus input of operational amplifier OP2 configured in a unity gain voltage follower configuration to allow isolation between the resistor network and input IN1 of the analog-to-digital converter 61. The output of amplifier OP2 also applies a low input impedance to the analog-to-digital converter. The other lead of resistor $R_B$ is grounded. The purpose of the precision resistor network is to attenuate the voltage Vhead from the voltage regulator 52 by a precise factor $$\frac{R_B}{R_A + R_B}$$

such that the subsequent voltage level, $V_1$, is compatible with the maximum allowed voltage input of the analog-to-digital converter 61.

Operational amplifiers OP1 and OP2 may be precision low offset output voltage devices such as the LT1013 as made by Linear Technology Corp., of Milpitas, Calif.

Resistors $R_A$ and $R_B$ may be precision plus or minus 0.1% devices of value 10K and 5K ohms respectively.

The portions of the circuits of FIGS. 1, 2A, and 2B described above have the capability of automatically measuring the absolute value of all of the resistive elements 22 contained within the thermal print head 20. This is accomplished as follows. Initially the processor 62 applies an OFF signal to ON/OFF line 53 to turn off the voltage regulator 52, thus preventing the voltage regulator 52 from applying a +17.6 V regulated voltage to the VHEAD line 48 and to the thermal printhead resistive elements $R_1$-$R_N$ in FIG. 1 and $R_3$-$R_N$ in FIG. 2B. The turning off of the voltage regulator 52 forward biases the diode 60, which has its cathode coupled to the VHEAD line 48 and its anode coupled through the two parallel-connected field effect current regulator diodes 56 to a +28 V potential.

With diode 60 forward biased, the 10 ma of constant current from current regulator diodes 56 flows through the diode 60 and through a selected one of the thermal elements $R_1$-$R_N$ in FIG. 1 and $R_3$-$R_N$ in FIG. 2B, and its associated one of the driver transistors $Q_1$-$Q_N$ to ground. Any given one of the thermal resistive elements $R_1$-$R_N$ in FIG. 1 and $R_3$-$R_N$ in FIG. 2B, can be controllably selected by selectively enabling its associated one of the driver transistors $Q_1$-$Q_N$ in FIG. 1 and $Q_3$-$Q_N$ in FIG. 2B.

For measurement purposes, only one of the thermal printhead elements $R_1$-$R_N$ in FIG. 1 and $R_3$-$R_N$ in FIG. 2B is activated or turned on at any given time. This is accomplished by the processor 62 outputting serial data onto the SERIAL DATA line 44 and associated clock pulses onto the CLOCK line 40. The serial data contains only one "1" state bit which is associated in position within the serial data to the position of the element 22 in the printhead 20 that is to be measured, with the remaining $N-1$ bits in the serial data being "0" state bits.

The serial data containing only one "1" state bit is clocked from the line 44 into the shift register 36 by means of the clock pulses on line 40. The position of this "1" state bit in the serial data in register 36 corresponds to the position of the element in the printhead that is to be measured. This "1" state bit in the register 36 is latched into latch 34 by a LATCH pulse on line 38. That latched "1" state bit, which is now at an associated one of the outputs $L_1$-$L_N$ of latch 34 of FIG. 1 and $L_3$-$L_N$ of FIG. 2B, is then used to enable the associated one of AND gates 30, at the time of a TBURN pulse from the interface circuitry 42, to activate the desired one of the elements $R_1$-$R_N$ in FIG. 1 and $R_3$-$R_N$ in FIG. 2B by turning on the associated one of the transistors $Q_1$-$Q_N$ in FIG. 1 and $Q_3$-$Q_N$ in FIG. 2B. For example, if element $R_1$ in FIG. 1 is to be measured, only the last bit clocked into the register 36 would be a "1" state bit. This "1" state bit would be applied via line $SR_1$ to latch 34 and latched therein by a LATCH pulse. This "1" state bit in latch 34 would be applied via line $L_1$ to enable the corresponding AND gate 30 at the time of the TBURN pulse to turn on transistor $Q_1$ and thereby activate element $R_1$ and thus allow its resistance to be measured upon application of the constant current.

Alternatively, it has been determined in practice that the TBURN line 32 may be left on for the entire print head element resistance measurement period as the constant current flowing through the element is comparatively low, and the required system measurement time is small.

It will be recalled that, when diode 60 is forward biased, the 10 ma of constant current from the current regulator diodes 56 flows through the diode 60 and through the selected one of the thermal elements $R_1$-$R_N$ of FIG. 1 and $R_3$-$R_N$ of FIG. 2B and its associated one of the driver transistors $Q_1$-$Q_N$ of FIG. 1 and $Q_3$-$Q_N$ of FIG. 2B to ground. This 10 ma of constant current causes a voltage VSENSE to be developed at the junction 58 of the diode 60 and the parallel-connected diodes 56.

The amplitude of VSENSE is substantially dependent upon the amplitude of the voltage developed across the selected one of the elements $R_1$-$R_N$ of FIG. 1 and $R_3$-$R_N$ of FIG. 2B, which in turn is dependent upon the resistance of the selected one of the elements $R_1$-$R_N$ of FIG. 1 and $R_3$-$R_N$ of FIG. 2B. More specifically, the amplitude of VSENSE can be determined by the equation:

$$VSENSE = (0.01A) \cdot R_{TPH} + V_{D60} + V_{QTPH}$$

where
0.01A = 10 ma
$R_{TPH}$ = resistance of whichever thermal printhead element has been selected for measurement ($R_1$-$R_N$ in FIG. 1 or $R_3$-$R_N$ of FIG. 2B)
$V_{D60}$ = voltage drop across the germanium diode 60 (typically 0.2 to 0.3 V)
$V_{QTPH}$ = voltage drop across whichever saturated driver transistor is turned on by the "1" state bit (typically 0.8 V).

Thus, a VSENSE value equaling voltage measured at input IN0 to the analog-to-digital converter 61 can be determined for each of the thermal elements $R_1$-$R_N$ of FIG. 1 and $R_3$-$R_N$ of FIG. 2B in the thermal printhead 20. Each VSENSE value is sequentially digitized by an analog-to-digital converter (A/D Conv.) 61, upon which the processor 62 temporarily stores the digitized VSENSE value into one of the processor general purpose registers 92. The software program stored in read-only memory (ROM) 66 then directs the processor 62 to subtract the digitized equivalent of the sum of $V_{D60}$ and $V_{QTPH}$ to obtain the digitized equivalent of (0.01 A)($R_{TPH}$) measurement and thus obtain a value which effectively corresponds to the respective element resistance. These computed digitized values of (0.01 A) ($R_{TPH}$) for the printhead elements are then stored in RAM memory 64.

To obtain the absolute element resistance $R_{TPH}$ one would have to divide the (0.01 A) $R_{TPH}$ value by the constant 0.01 A. In actual practice the linearly related term 0.01 A $R_{TPH}$ is used and stored in RAM memory.

This sequence of measuring VSENSE for an element, subtracting the term $V_{D60}$ + $V_{QTPH}$, and storing in RAM memory is repeated for all elements within the print head.

There are at least two techniques to obtain the digitized value which represents the sum of $V_{D60}$ + $V_{QTPH}$. The first, represented by FIG. 1, involves assuming a constant non-varying voltage drop as a result of the constant 10mA electrical current. For example $V_{D60}$ + $V_{QTPH}$ = 0.25 V + 0.8 V = 1.05 volts. This 1.05 volts may in turn be digitized by the analog-to-digital converter 61 during design and programmed as a fixed value into ROM 66. This approach is satisfactory for most applications. Furthermore a fixed constant value can also be assumed for VHEAD and programmed as a fixed value in ROM.

The second approach is illustrated in FIGS. 2A, 2B and may be utilized for applications where higher accuracy is desired. This second approach is in fact a preferred approach. As illustrated in FIGS. 2A, 2B, two of the print head elements, say for example $R_1$ and $R_2$, have been made inoperative and their associated transistor drivers, $Q_1$ and $Q_2$, have been used to provide an automatic technique in determining a digitized value for the actual ($V_{D60}$ + $V_{QTPH}$) value, and also a determination of the actual value of the regulated current. If transistors $Q_1$ and $Q_2$ are not selected for this technology, transistors $Q_{N-1}$ and $Q_N$, located at the opposite end of the print head element line, should be selected, such that the printing operation need not be affected.

It is seen from FIGS. 2A, 2B that the collector 28 of transistor $Q_1$ is connected directly to the VHEAD line 48. It is noted that the collector 28 of transistor $Q_2$ is connected to one end of a precision ($\pm 0.1\%$) discrete resistor 22B of value $R_{NOMINAL}$ which equals the print head manufacturer's specified nominal element average resistance. The other end of this precision discrete resistor 22B is connected to the VHEAD line 48. The precision discrete resistor 22B resides on the print head proper 20 adjacent to the driver transistors. It is not located next to the elements $R_3$-$R_N$, nor does it play a role in the actual physical printing operation.

The operation of this second technique to obtain a digitized value for the sum of $V_{D60}$ + $V_{QTPH}$ is quite simple.

First, only transistor $Q_1$ is selected by the methods previously described, producing a sense voltage $VSENSE_1 = V_{D60} + V_{QTPH}$ which appears at the input IN0 to the analog-to-digital converter 61. Unlike the first approach described for FIG. 1 above, with this new technique, a measurement is provided of the actual diode and saturated transistor collector-emitter drops along with any connector interconnect voltage drops. These voltage drops may be approximated with one number as was done in the first approach of FIG. 1 but in practice they will be dependent on the actual parts used and the actual usage configuration (setup and environment).

This $VSENSE_1$ is then digitized by the analog-to-digital converter 61 and stored in RAM 64 by the processor 62. Note that the $VSENSE_1$ value is comparatively insensitive to minor variations in the 10mA constant current regulated by current regulator diodes 56.

Next, only transistor $Q_2$ is selected by the methods previously described producing a sense voltage, $VSENSE\ 2 = (I_{10mA})\ R_{NOMINAL} + V_{D60} + V_{QTPH}$ which appears at the input to the analog-to-digital converter 61. The sense voltage $VSENSE_2$ is digitized and stored in RAM 64 by the processor 62.

The processor 62 then subtracts the digitized value of $VSENSE_1$ from the digitized value of $VSENSE_2$. $VSENSE_2 - VSENSE_1 = [(I_{10mA})R_{NOMINAL} + V_{D60} + V_{QTPH}] - [V_{D60} + V_{QTPH}] = (I_{10mA})R_{NOMINAL}$.

Now since $R_{NOMINAL}$ is a precision (within plus or minus 0.1%) known resistance value, the voltage generated across it by a calibrated current of 10mA can be determined and stored in ROM 66 at the time of software programming.

Since cost constraints prevent a calibrated current source from being used for current regulating diodes 56 in a production environment, use is made of inexpensive current regulating diodes such as are made by Motorola and others which are capable of regulating currents to plus or minus ten percent.

The purpose then of computing $VSENSE_2 - VSENSE_1$ is to factor this plus or minus ten percent tolerance out of the equation.

The processor 62 computes a correction factor C by taking the ratio of the calibrated digitized value stored in ROM 66 to the actual measured value $VSENSE_2 - VSENSE_1$ stored in RAM 64.

$$C = \frac{10\ mA\ RNOMINAL}{VSENSE_2 - VSENSE_1} = \frac{10\ mA\ RNOMINAL}{I_{10\ mA}\ RNOMINAL}$$

$$= \frac{10\ mA}{I_{10\ mA}}$$

Thus, since $I_{10mA}$ can vary plus or minus 10%, the correction factor C will accommodate this variation. For example, if the actual value of $I_{10mA}$ is slightly lower than 10mA, the measured value of $VSENSE_2-VSENSE_1$ might indicate a resistance lower than RNOMINAL. However, since RNOMINAL is known to within ±0.1% we can account for the lower current and provide the correct value of RNOMINAL by multiplying $(VSENSE_2-VSENSE_1)$ by C.

This correction factor C will be used for each and every resistance measurement made within the printhead. Its purpose is to compensate for a regulated measurement current which differs from the nominal design value.

To summarize, the sequence for each print head element resistance measurement cycle in FIGS. 2A, 2B is as follows:

A. CALIBRATION

1. Determine $VSENSE_1 = V_{D60} + V_{QTPH}$
2. Determine the regulated measurement current calibration factor C.

B. MEASUREMENT OF ELEMENTS

3. Measure VSENSE for each of the elements
4. Subtract $VSENSE_1$ from VSENSE
5. Multiply the difference by the correction factor C to obtain the final measure of the element's resistance.
   $= C [VSENSE - VSENSE_1]$ Once again, it should be noted that the actual element resistance would be obtained by dividing the quantity C $[VSENSE-VSENSE_1]$ by 10mA. In practice, however, this is not necessary. It should also be noted that in practice the print head element driver transistors $Q_1-Q_N$, the latches $L_1-L_N$ and the shift registers $SR_1-SR_N$ are contained in LSI integrated circuits in groups of 32 or 64; that is, 32 drivers, latches and shift registers all in one integrated circuit. As a result, in practice there is a characteristic $V_{QTPH}$ for each LSI integrated circuit. Therefore a more precise implementation would have one driver transistor from each LSI integrated circuit, similar to transistor $Q_1$ of FIG. 2B, dedicated for calibration purposes such that the value $V_{QTPH}$ for each integrated circuit can be determined. The result of the above is a table of digital values in the RAM memory 64 corresponding to each element resistance within the printhead.

Following the measure of each of the print head elements the processor 62 applies an ON signal to the ON/OFF line 53 to turn on the voltage regulator 52 allowing the VHEAD voltage to appear at 26.

In addition to the previously-mentioned interface circuitry 42, parallel-to-serial shift register 46, analog-to-digital converter 61, processor 62 and random access memory (RAM) 64, the system for controlling the energization and operation of the thermal print head 20 includes a read-only memory (ROM) 66 and data input means 68. The data input means 68 may take any desired or appropriate form, such as a communications interface with another system, for example, such as an interface with a video memory or the like. A digital data bus 70 couples these various components together, for purposes of communication and control. The digital data bus 70 actually comprises three separate buses, a data bus 72, an address bus 74 and a control bus 76, which interconnect various components of the system, as shown in greater detail in FIGS. 3A, 3B, 4A and 4B of the drawings.

Figure 3A:
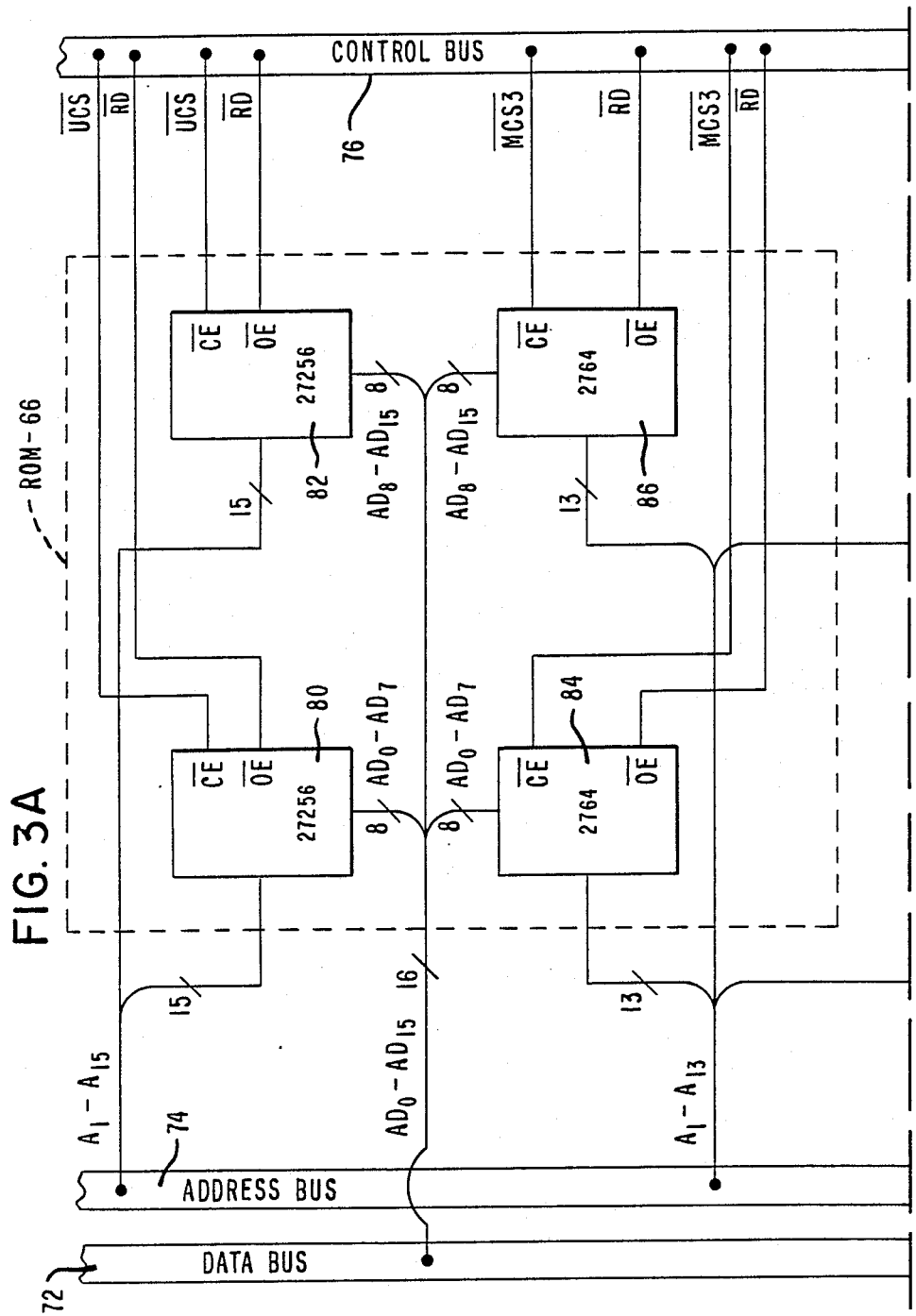
FIGS. 3A and 3B together are a detailed view of a portion of the block diagram of FIGS. 1 and of FIGS. 2A and 2B, showing the random access memory, the read-only memory and the processor.

As shown in FIG. 3A, the read-only memory (ROM) 66 may comprise a pair of 27256 ROM integrated circuit chips 80, 82, manufactured by Intel Corporation, Santa Clara, Calif., providing 32K words, of 16 bits each, of memory, together with a pair of 2764 chips 84, 86, manufactured by Intel Corporation, comprising a custom cartridge which provides 8K words of customer-specific read-only memory. The connections of these chips to each other, and to the data, address and control buses 72, 74 and 76 are shown in FIG. 3A.

Figure 3B:
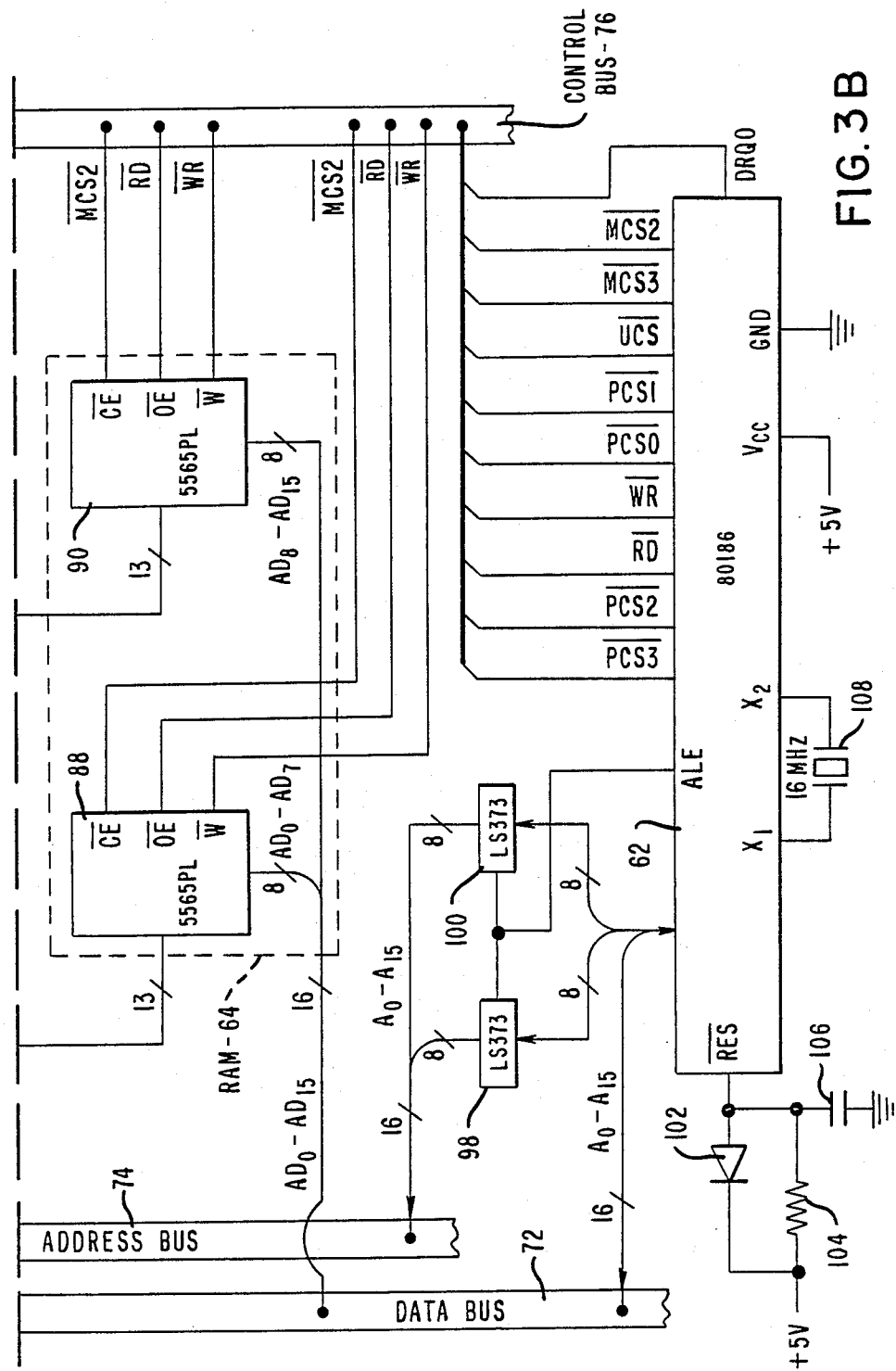

As shown in FIG. 3B, the random access memory (RAM) 64 may comprise a pair of 5565 chips 88, 90, manufactured by Toshiba America Inc., Irvine, Calif., and providing 8K words of random access memory. The connections of these chips to each other, to other components, and to the data, address and control buses 72, 74 and 76 are shown in FIG. 3B.

Also shown in FIG. 3B is the processor 62. For purposes of design cost-effectiveness, it is desirable to utilize a relatively inexpensive microprocessor for the processor 62, rather than a more expensive minicomputer with high-speed serial data bases. The resulting operating speed limitations can be overcome by use of direct memory access (DMA) capabilities of a suitable microprocessor, such as the sixteen-bit 80186 microprocessor manufactured by Intel Corporation, Santa Clara, Calif., shown diagrammatically in FIG. 13, and generally designated 62. The microprocessor combines an enhanced 8 MHZ CPU 92 with a clock generator 94, two independent high speed 2-megabyte per second DMA (direct memory access) channels 0 and 1 in DMA section 95, a programmable interrupt controller 96, and a register section 97 which includes three programmable 16-bit timer/counters 0, 1 and 2, among other features. This microprocessor utilizes the same software instruction set as the 8086 and the 8088 microprocessors, with the addition of some of its own instructions.

Figure 13:
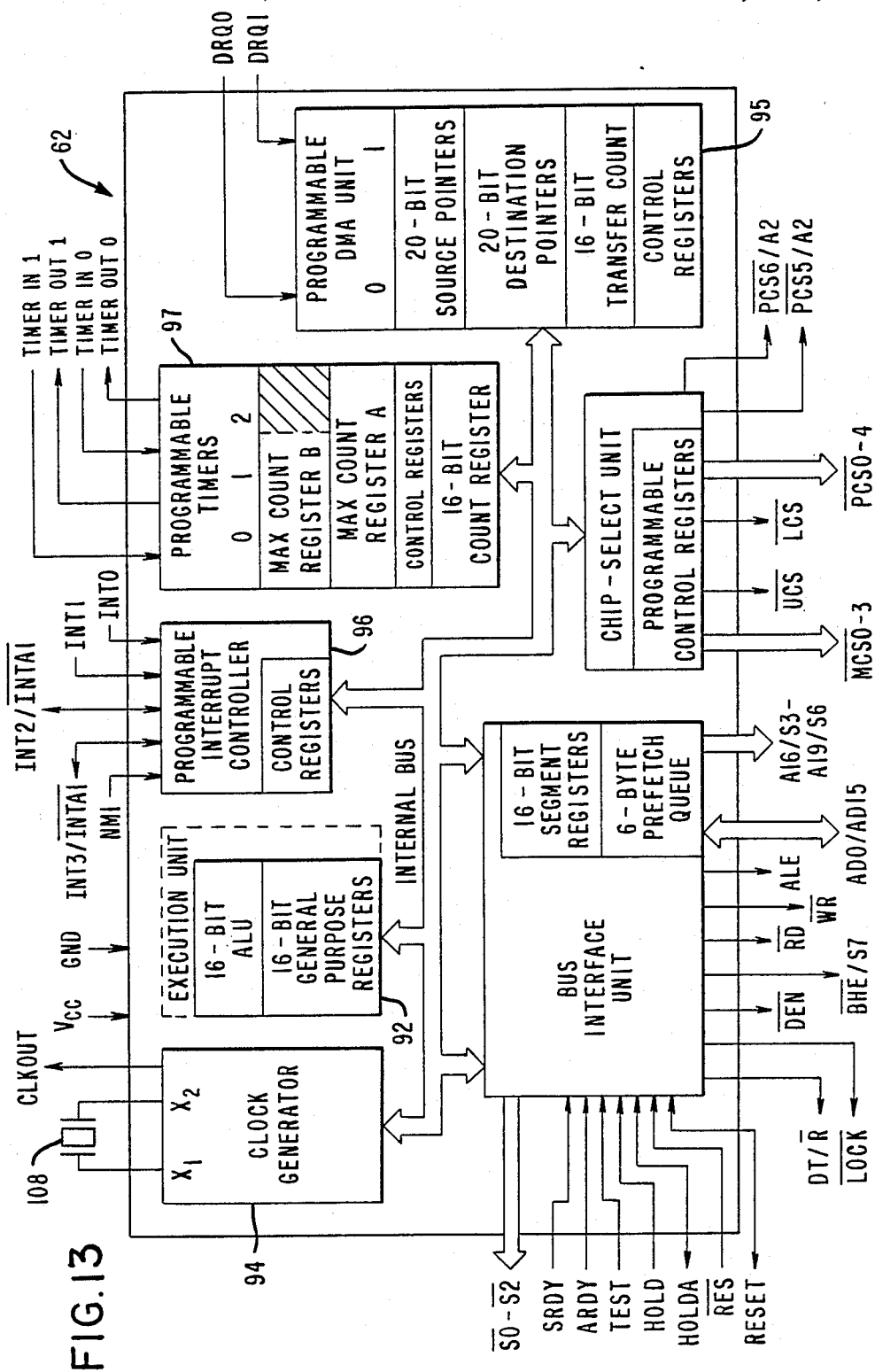
FIG. 13 is a diagrammatic view of a microprocessor which is employed in the illustrated embodiment of the invention.

Using DMA techniques, information for the thermal print head shift register 36 is transferred via the data input 68, stored in the RAM 64, transferred to the parallel-to-serial shift register 46 one sixteen bit word at a time, and then serially clocked at a 4.5 MHZ speed into the thermal print head shift register 36 over the serial data line 44, as will be subsequently described in greater detail. The connections of the processor 62 to the data, address and control buses 72, 74 and 76 are shown in FIG. 2B, and include two LS373 latch integrated circuit chips 98, 100, manufactured by Texas Instruments Inc., Dallas, Tex., which are interposed between the processor 62 and the address bus 74 and which are used to latch the address off of the multiplexed data bus 72 and onto the address bus 74. Also shown in association with the processor 62 in FIGS. 3B and 13 are a potential source of +5 volts which is applied to the processor 62 and to a circuit which includes a diode 102, a resistor 104 and a capacitor 106, which serves as a power-up reset; and a crystal 108 connected between the X1 and X2 pins of the processor 62.

The analog-to-digital converter 61 transfers its data to the processor general purpose registers 92 or to RAM memory under processor control over data bus 72. The analog-to-digital converter 61, which may be of type ADC0809 as manufactured by National Semiconductor or Texas Instruments, has eight allowed analog inputs $IN_0$ to $IN_7$ which are selected by the microprocessor 62 through address lines $A_1$ to $A_3$ taken from address bus 74. The VSENSE voltage appears at IN0 while the V1 voltage appears at IN1.

Figure 4A:
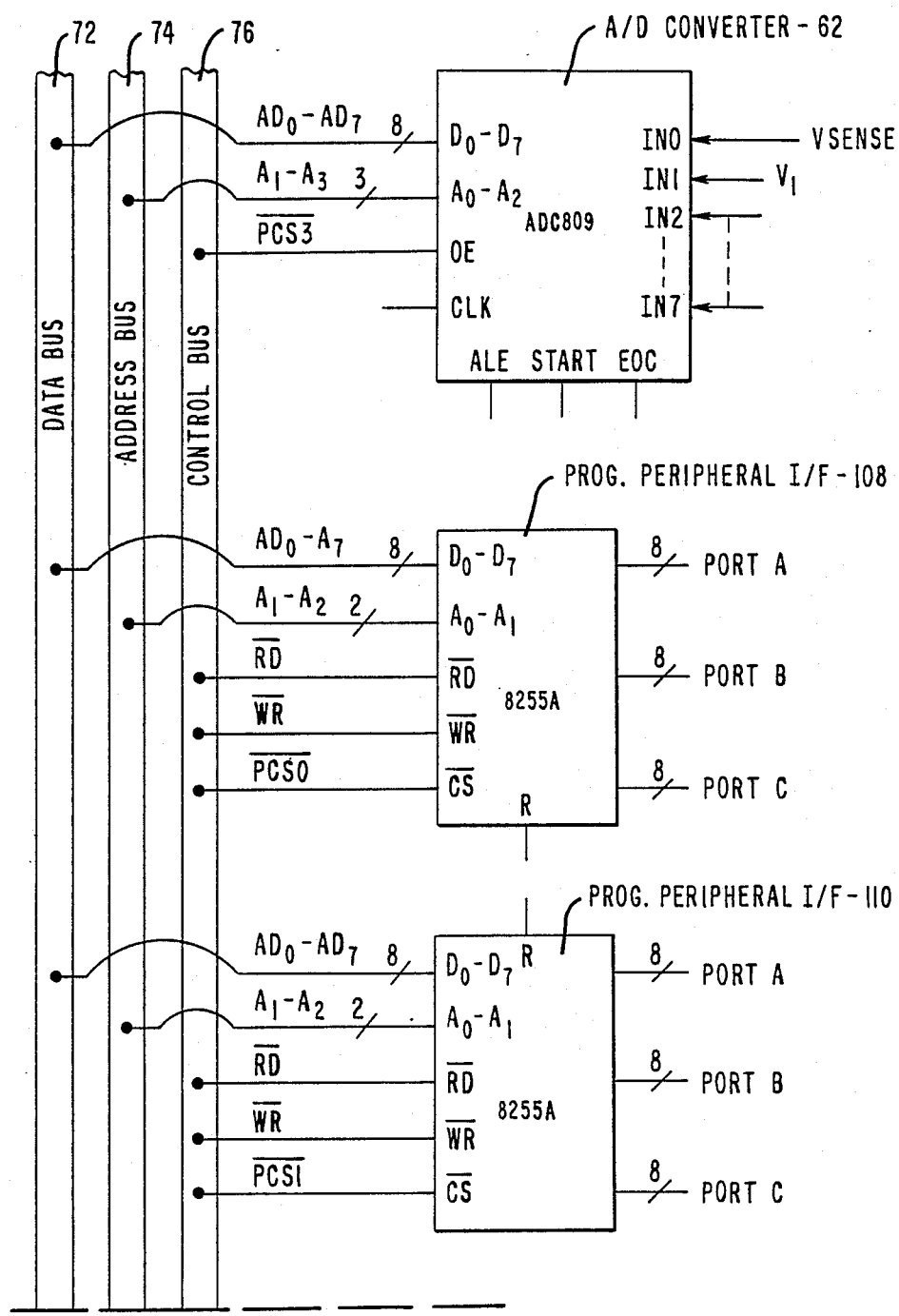
FIGS. 4A and 4B together are a detailed view of a portion of the block diagram of FIG. 1, showing the analog-to-digital converter, the interface circuitry and the parallel-to-serial shift registers.

The processor 62 communicates with the external world through six ports, three of which (ports A, B and C) are provided on each of two programmable peripheral interface devices 108 and 110 of FIG. 4A, which are included in the interface circuitry 42 of FIGS. 1 and 2A, 2B, and which may be of type 8255A, manufactured by Intel Corporation.

Figure 4B:
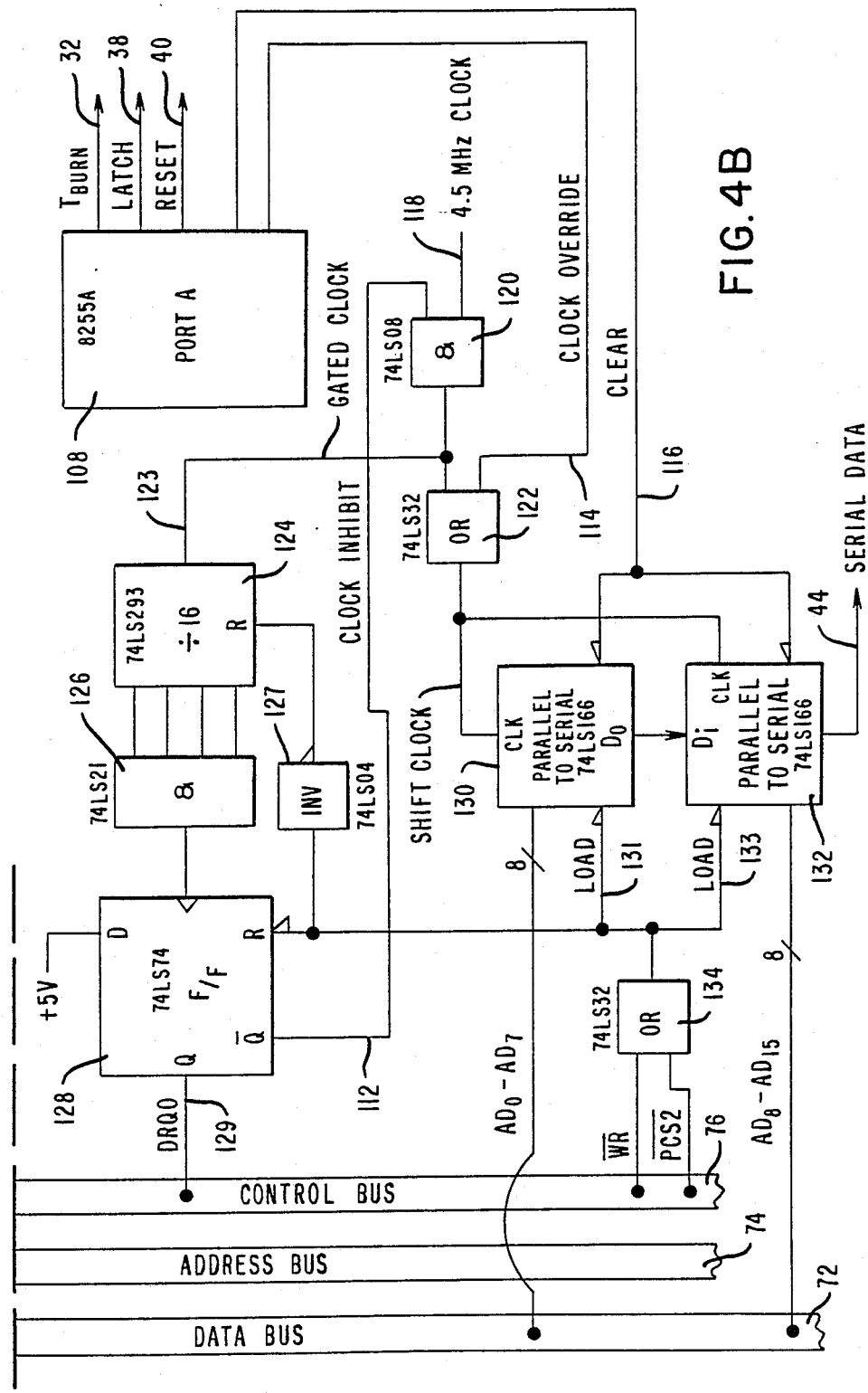

In the illustrated embodiment, port A of interface device 108 is dedicated to controlling the thermal print head 20 and its associated circuitry, as shown diagrammatically in FIG. 4B, which contains a fragmentary inclusion of device 108, and various conductors coupled thereto, including the TBURN line 32, the LATCH line 38, the RESET line 40, a CLOCK OVERRIDE line 114, and a CLEAR line 116.

The CLOCK INHIBIT line 112 derived from the $\bar{Q}$ output of flip flop 128 and a 4.5 MHZ clock line 118 are provided as inputs to an AND gate 120, which may be of type 74LS08, manufactured by Texas Instruments Inc., Dallas, Tex. The output of the AND gate 120 is applied to one input of an OR gate 122, which may be of type 74LS32, manufactured by Texas Instruments Inc.; and via the GATED CLOCK line 123 to a divide-by-sixteen device 124, which may be of type 74LS293, manufactured by Texas Instruments Inc. Four outputs of the device 124 are applied to the inputs of a four-input AND gate 126, which may be of type 74LS21, manufactured by Texas Instruments Inc. For every sixteen pulses applied to the input of the device 124, one pulse appears on the output of the AND gate 126. This pulse is applied to the clock input of a flip-flop 128, which may be of type 74LS74, manufactured by Texas Instruments Inc. The LOAD signal 131 is applied to the reset terminal of the flip flop 128 and through a 74LS04 inverter 127 to the (active high) reset terminal of a divide-by-sixteen circuit 124. It is also applied to the parallel-to-serial registers 130 and 132, as will be subsequently discussed. The Q output of the flip-flop 128 is applied via line 129 by means of the control bus 76 to the DMA DRQ0 section of the processor 62 to signal to the processor that a DMA cycle is to be initiated. At the same time, the $\bar{Q}$ output of flip flop 128 is fed back over the CLOCK INHIBIT line 112 to prevent further data from being transferred to the print head.

In addition to the input of the OR gate 122 to which the output of the AND gate 120 is applied, a second input of said OR gate 122 has applied thereto the CLOCK OVERRIDE signal on line 114. The output of the OR gate 122, SHIFT CLOCK, is applied to the clock input terminal of each of the two eight-bit parallel-to-serial registers 130 and 132 which comprise the parallel-to-serial register 46 shown in FIGS. 1 and 2A, 2B, to provide a clock input therefor. The registers 130 and 132 may be of type 74LS166, manufactured by Texas Instruments Inc. The data out ($D_O$) output of parallel-to-serial register 130 is connected to the data in ($D_i$) input of parallel-to-serial register 132, creating effectively a 16-bit register. A CLEAR signal 116 is applied to the registers 130, 132 via line 116. A LOAD signal is applied to the registers 130, 132 on lines 131 133, and to the reset line of flop 128, from an OR gate 134, which may be of type 74LS32, manufactured by Texas Instruments Inc. The input signals WR/ and PCS2/ are applied to the gate 134 from the microprocessor 62, via the control bus 76. Data signals AD0 to AD15 are applied to registers 130 and 132 from the RAM 64 via the data bus 72. The output of the register 132 is applied to the shift register 36 of the thermal print head 20 over the SERIAL DATA line 44.

Figure 5:
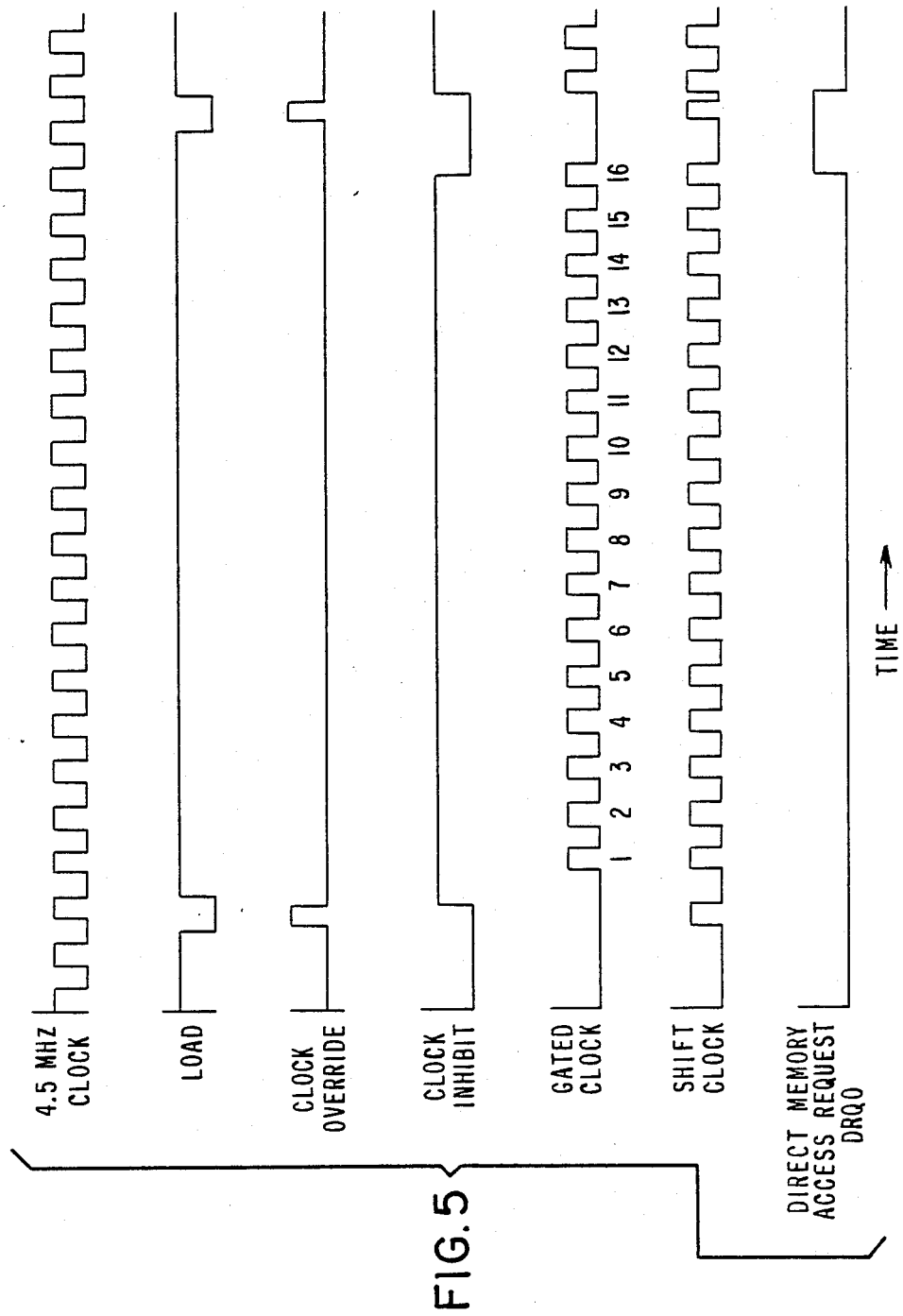
FIG. 5 illustrates a simplified timing diagram of the system for one block of sixteen bits loaded into the thermal print head shift register.

When it is desired to transfer data from the RAM 64 (FIGS. 1 and 2A, 2B) to the thermal print head shift register 36, the processor 62, acting upon receipt of a signal DRQ0, sets up an internal DMA channel, which in turn sets the DMA pointers in the DMA section 95 to the special BIT TABLE location in RAM 64 where the thermal print head element control information is situated. The actual data transfer is performed under control of the DMA section 95 of the processor 62. The parallel-to-serial registers are loaded when both the write signal WR/ and the chip select signal PCS2/ are low. The resultant load signals 131 and 133 latch the data appearing on the data bus 72 into the two registers 130 and 132 when a synchronized CLOCK OVERRIDE pulse is applied through OR gate 122. Shown in FIG. 5 is a simplified timing diagram of operation of the system for the loading of one block of sixteen bits into the thermal print head shift register 36. Shown in the Figure are wave forms for the 4.5 MHZ clock which appears on line 118; the LOAD signal which appears on line 131, 133; the CLOCK OVERRIDE signal on line 114; the CLOCK INHIBIT signal which appears on line 112; the GATED CLOCK signal which appears on line 123; the SHIFT CLOCK line which connects the OR gate 122 to the two parallel-to-serial registers 46; and the DIRECT MEMORY ACCESS REQUEST signal which appears on line 129.

Figure 6:
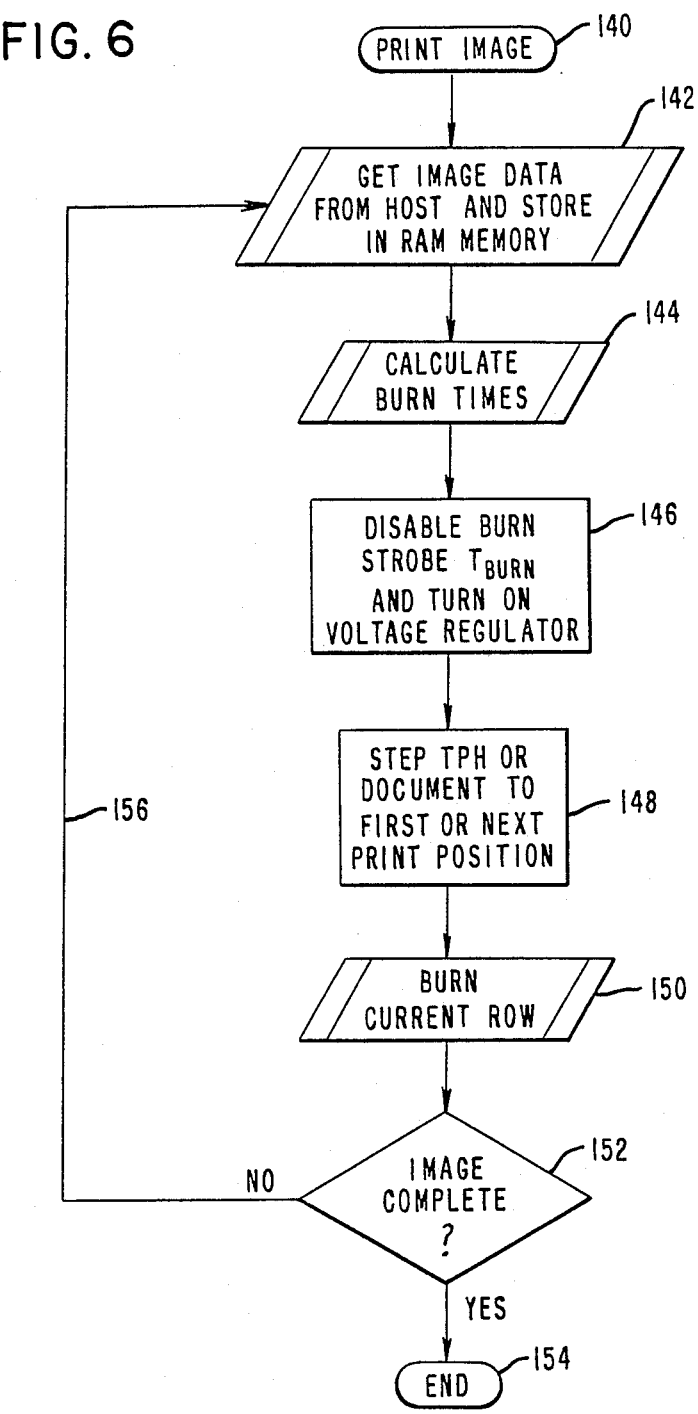
FIG. 6 is a flow diagram showing the operation of the system during a printing operation.

A general flow diagram comprising a number of software subroutines setting forth the thermal printing process embodied in the present invention is shown in FIG. 6. Following the PRINT IMAGE command in block 140, the system first obtains, through data input 68, image data from the host with which it is operatively associated and stores that information in the RAM 64, block 142. This data will determine the optical density of each pixel to be printed. As will be seen, it will therefore have a direct relationship to the required BURN TIME of each element contained within the print head. Next, the individual burn times for the individual thermal print head elements are determined as indicated in block 144. These burn times actually take the form of a "burn increment" count where each "burn increment" represents the smallest possible basis burn pulse interval.

In block 146, the BURN STROBE line TBURN is disabled and the voltage regulator 52 is turned on.

When this has been done, the thermal print head 20 (or the document) is advanced or stepped via a stepper motor to the first or next print position, as indicated in block 148.

Next, as indicated in block 150, a burn operation is performed for the data contained in the current row to be printed, utilizing the burn increment data developed in block 144 for each of the print head elements. Following this, as indicated in decision block 152, the system checks to see if the image being printed is now complete. If so, the process proceeds to the end, as represented by block 154. If not, the process loops back on path 156 to obtain image data for the next row to be printed, as represented by block 142.

Each of the subroutines noted in FIG. 6 will now be considered. As well as considering the general case, an illustrative example of an exemplary print head consisting of 318 elements will also be considered to aid in understanding each of the subroutines in FIG. 6. Thus in FIGS. 2A, 2B, "N" would be 320.

Figure 14:
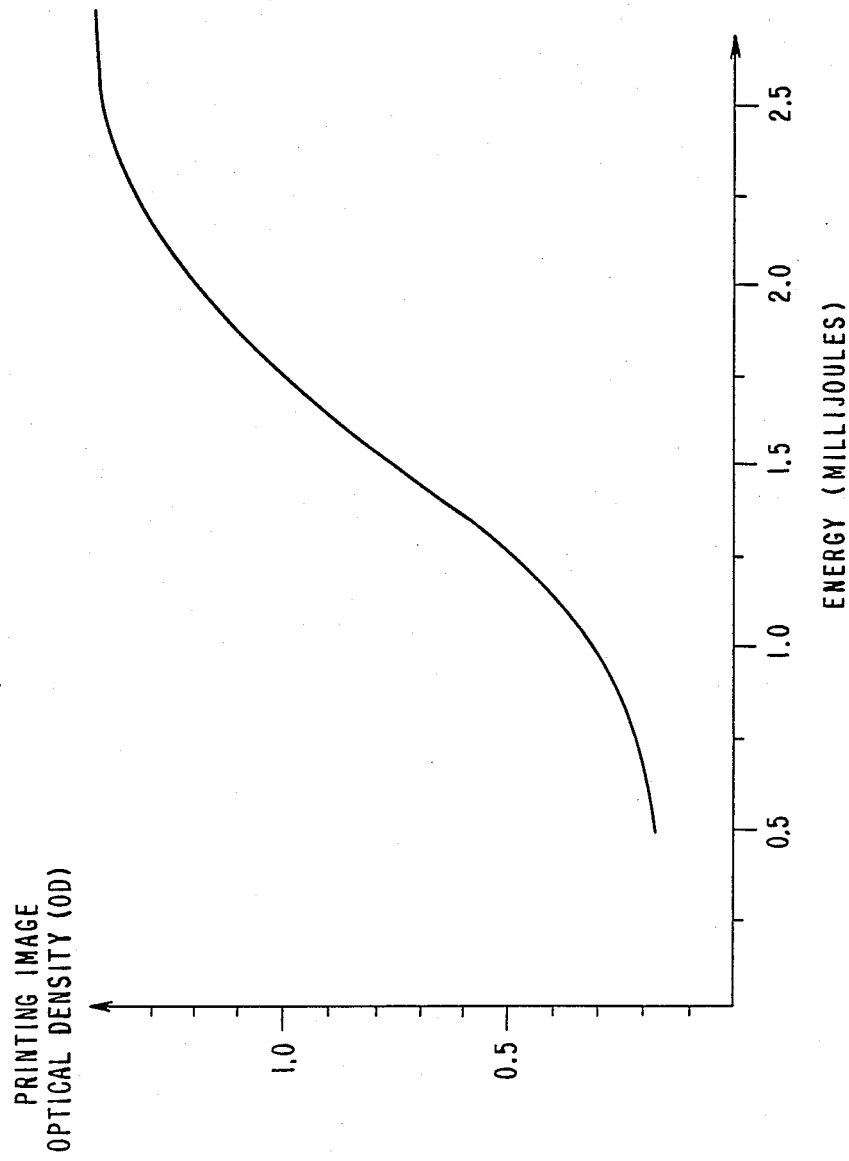
FIG. 14 is a plot showing the relationship between desired printing image optical density and required thermal print head energy to produce said optical density.

The first subroutine listed in FIG. 6 is the GET IMAGE DATA FROM HOST AND STORE IN RAM MEMORY routine. This subroutine retrieves a row of image data from the host through the DATA INPUT 68 module. Let it be assumed for the illustrative example that in the first row of pixel information transmitted to the RAM 64 bus, only five pixels of the total possible 318 need be printed. The conversion from pixel optical density to corresponding required element energy density has already been done by the host processor following a predetermined experimentally derived relationship such as is illustrated in FIG. 14 for a fixed nominal print head element resistance. TABLE 1 shows the element energies associated with the required optical densities as derived from FIG. 14 for the five pixel elements being printed in the first print row of the illustrative example.

TABLE 1

| PRINT HEAD ELEMENT # | DESIRED OPTICAL DENSITY | CORRESPONDING REQUIRED ENERGY (milliJoules) |
|---|---|---|
| 23 | 0.8 | 1.50 |
| 105 | 1.1 | 1.87 |
| 147 | 1.0 | 1.75 |
| 207 | 1.2 | 2.0 |
| 290 | 0.6 | 1.25 |

Digitized information corresponding to all 318 elements is stored in the area allotted to the "BURN TIME TABLE" in RAM 64; however only the locations associated with the five aforementioned elements have non-zero values.

Figure 7A:
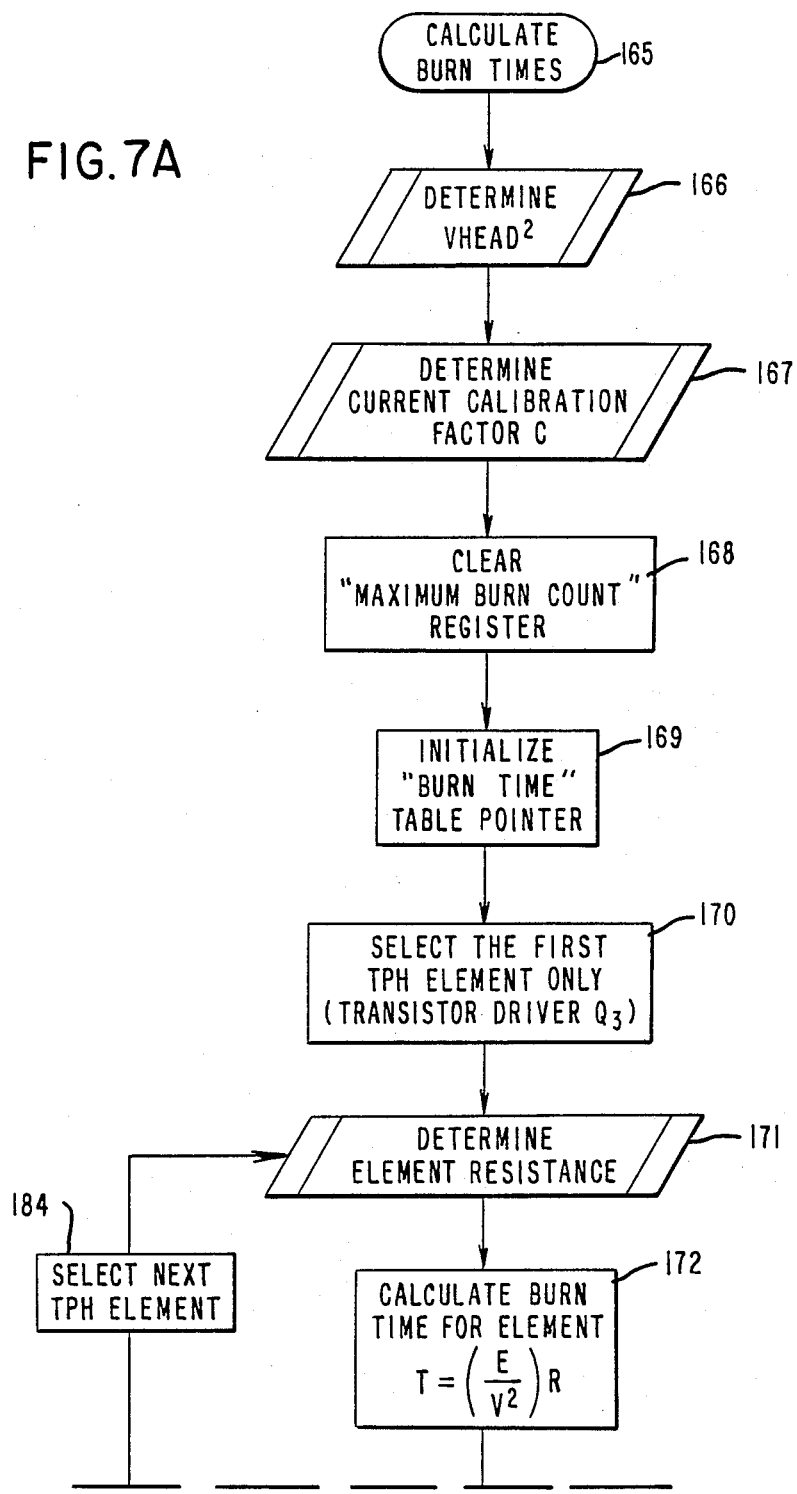
FIGS. 7A and 7B together constitute a flow diagram showing the process for measuring element resistances and calculating burn times.
Figure 7B:
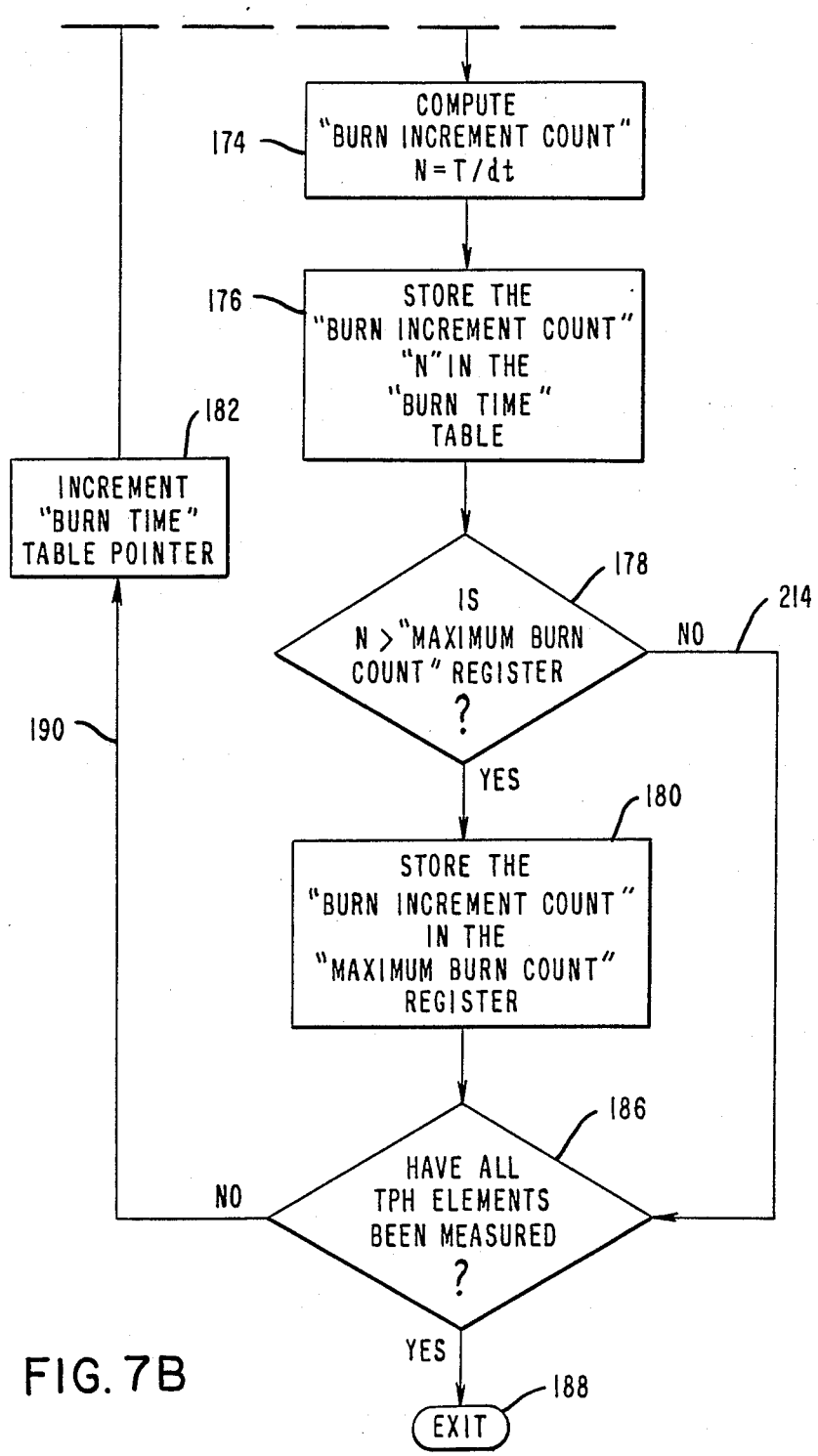

FIGS. 7A and 7B illustrate the process for calculating the element burn times and the process for converting the burn times into burn increment counts, as represented by block 144 of FIG. 6. The command "CALCULATE BURN TIMES" is represented by block 165. The first step in the process, as indicated by block 166, is to call a subroutine which accurately determines the square of the thermal print head's driving potential, VHEAD. This will be described subsequently in connection with FIG. 8.

Figure 9:
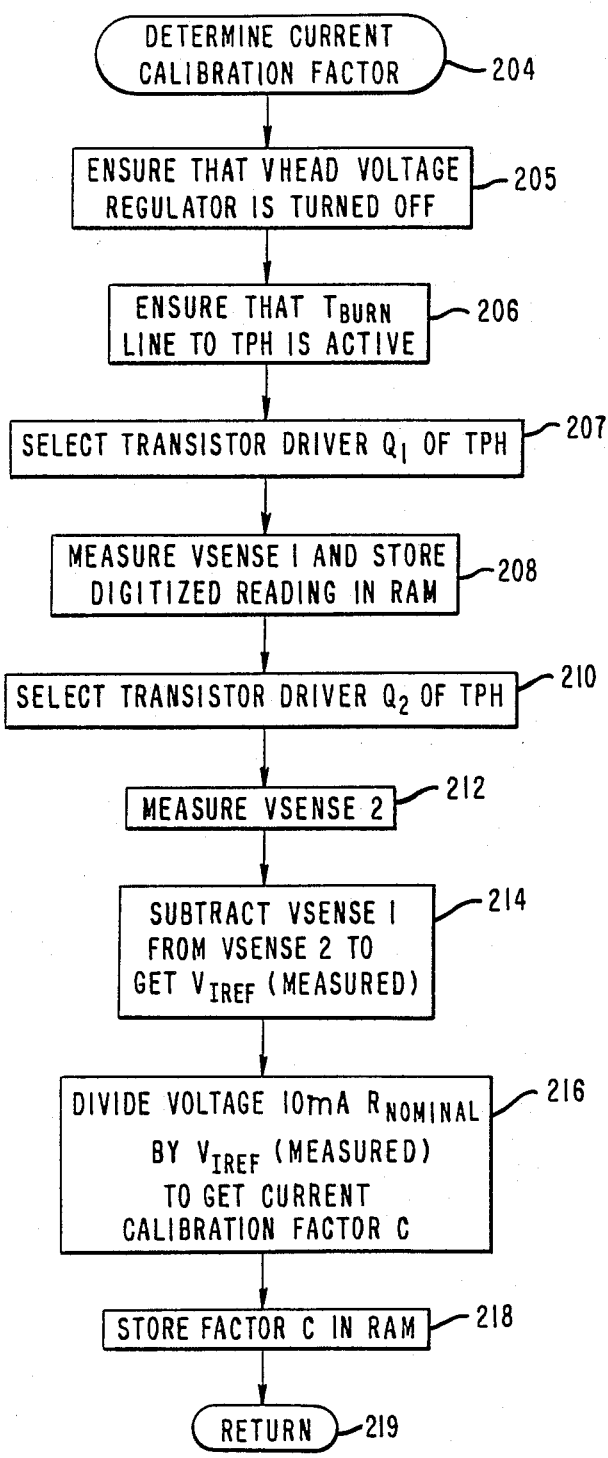
FIG. 9 is a flow diagram showing the process for obtaining the current calibration factor.

The next step in the process is to call a subroutine to determine a current calibration factor C, as indicated by block 167. The current calibration factor, C, is required to correct any error in the element resistance readings due to variations in the constant current used to develop the voltages at the VSENSE input 58 of FIGS. 1 and 2A. This subroutine will be subsequently described in detail when FIG. 9 is discussed.

As indicated by blocks 168 and 169, the next step is to clear the "maximum burn count" register and initialize the "BURN TIME" TABLE POINTER. At the end of the processes, the maximum burn count register will contain a value equal to the greatest burn count encountered while setting the burn counts for each of the 318 thermal elements (i.e. the longest burn time). The "BURN TIME" TABLE POINTER is set to point at the memory location in RAMs 88 and 90 containing burn information pertaining to the first print element which will be encountered during the element measurement process, $R_1$ of FIG. 1 and $R_3$ of FIG. 2B. Upon entry into this subroutine, the burn table contains the digitrzed energy information provided by the host as previously mentioned. Upon exit from this routine the burn table will contain the required burn increment counts needed to achieve the optical density specified by the host for each thermal printhead element.

Figure 10:
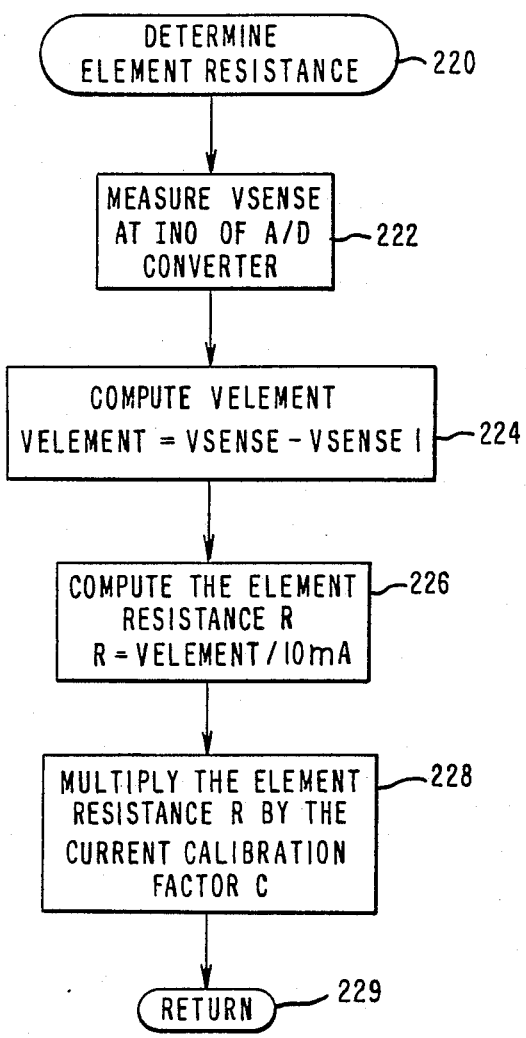
FIG. 10 is a flow diagram showing the process for determining element resistance, and multiplying it by the current calibration factor.

The first active thermal print head (TPH) element is then selected, as stated in block 170, and its corrected resistance is measured, as indicated in subroutine block 171. This subroutine will be described in detail when FIG. 10 is discussed. Following this, the burn time for the element, based upon its resistance, is calculated, as indicated in block 172, in accordance with the equation set forth therein. This is accomplished by multiplying the digitized energy value E located at the address set by the BURN TIME TABLE pointer and multiplying it by the value of R contained in the processor general purpose register 92. Finally the previously stored squared voltage measurement $v^2$ is retrieved from RAM 64 and divided into the just computed product ER to give the required burn time T for that particular print head element.

Block 174 computes the "BURN INCREMENT COUNT" which is derived by the formula illustrated in the block using the BURN TIME T just computed in block 172 and the constant 'dt'; the 'basis' time increment, which equals the inverse of the CLOCK FREQUENCY 118 of FIG. 4B. Thus for a BURN TIME T, the number of BURN INCREMENTS equals T/dt. Obviously for a given thermal printhead the higher the CLOCK FREQUENCY, the greater the number of BURN INCREMENTS that can be contained for a given BURN TIME and thus the greater the resolution of the system. In practice, the maximum CLOCK FREQUENCY is generally limited by the maximum clock rate of the print head shift registers 36. Typical maximum clock rates available at present peak around 4.5 MHz. This leads to a 'basis' time increment $$dt = \frac{n}{fCLOCK} = \frac{320}{4.5 \text{ MHz}} = 0.071 \text{ msec}$$

msec which corresponds to the time resolution of the system at present for the illustrative example. Higher clock rates and thus higher resolution systems will be available in the near future.

The computed BURN INCREMENT COUNT N is then stored in a "BURN TIME" TABLE in the RAM 64, as set forth in block 176.

In FIG. 7B, a determination is then made (block 178) as to whether the "burn increment count" "N" is greater than the contents of the "maximum burn count" register. If the decision from block 178 is "yes", the process proceeds to block 180, in which the "burn increment count" is stored in the "maximum burn count" register. Following this, the system ascertains whether all of the thermal print head elements have been measured, as set forth on decision block 186. If so, the system exits the routine, as per block 188. If not, the system loops back along path 190, incrementing the "burn time" table pointer (block 182) and selecting the next thermal print head element (block 184), before measuring the resistance of that thermal print head element in block 171, as previously described. Returning to block 178, if "N" is not greater than the "maximum burn count", the step represented by block 180 is omitted, and the process continues over path 214 to the decision block 186, and from there either to the exit 188 or over the path 190, as previously described. The routine of FIGS. 7A, 7B thus continues until all of the thermal print head elements have been measured (block 186) and the routine is exited (block 188).

Figure 8:
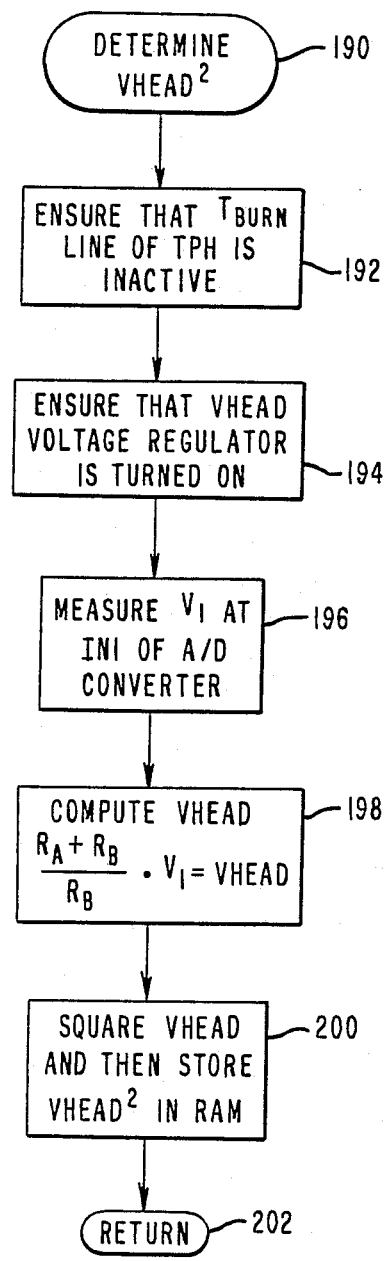
FIG. 8 is a flow diagram showing the process for obtaining the squared value of the thermal print head voltages.

FIG. 8 illustrates the process of determining the square of the thermal printhead (TPH) driver voltage, VHEAD. The command "DETERMINE VHEAD$^2$" is represented by block 190. The first two steps are to ensure that the TBURN line 32 of the TPH 20, is inactive and to ensure that the voltage regulator 52 is turned on, as indicated by blocks 192 and 194 respectively. The next step, block 196, is to digitize the voltage $V_1$, at input IN1 of the analog-to-digital converter 61. The next step is to compute the TPH driver voltage, VHEAD, based on the digitized voltage $V_1$, as indicated in block 198 in accordance with the equation therein. The final step shown in block 200 in the process is to square the calculated voltage VHEAD and then to store this value, VHEAD$^2$, in RAM for later use in calculating element burn times. The subroutine then returns to the "CALCULATE BURN TIMES" routine of FIGS. 7A and 7B, as represented by block 202.

FIG. 9 illustrates the process of determining a current calibration factor C. The command "DETERMINE CURRENT CALIBRATION FACTOR" is represented by block 204. In block 205, the voltage regulator 52 is turned off via ON/OFF line 53. In block 206, the TBURN line is made ACTIVE for the calibration and printhead resistance measurement routines. The first driver transistor $Q_1$ is selected in block 207, and then in block 208 VSENSE1 (which equals $V_{D60} + V_{QTPH}$) is digitized by the analog-to-digital converter 61 and stored in RAM 64. Next, driver transistor $Q_2$ is selected in block 210 and then VSENSE2 is digitized in block 212. In block 214, the voltage drop $V_{IREF}$ across the precision resistor, RNOMINAL of FIGS. 2A, 2B, is computed by subtracting VSENSE1 from VSENSE2. Then in block 216 the current calibration factor C is computed by dividing the constant voltage 10 mA RNOMINAL stored in ROM by the value from block 214 $V_{IREF}$ (measured) as described by the following equation:

$$C = \frac{10 \text{ mA } RNOMINAL}{V_{IREF} \text{ (measured)}} = \frac{10 \text{ mA } RNOMINAL}{VSENSE2 - VSENSE1} = \frac{10 \text{ mA } RNOMINAL}{I_{10 \text{ mA}} RNOMINAL}$$

The final step, block 218, is to store the factor C in RAM 64 for use in the calculation of the TPH element resistances. The subroutine then returns to the "CALCULATE BURN TIMES" routine of FIGS. 7A and 7B, as represented by block 219.

FIG. 10 illustrates the process of determining the resistance of a preselected TPH element $R_1-R_N$ of FIG. 1 or $R_3-R_N$ of FIG. 2B. The command "DETERMINE ELEMENT RESISTANCE" is represented by block 220. The first step, block 222, is to measure VSENSE; that is, to digitize the voltage at input IN0 of analog-to-digital converter 61 in FIGS. 1 and 2A, 2B. Next, the voltage drop across the selected element is determined by subtracting the previously determined value VSENSE1 from the new analog-to-digital converter reading VSENSE, as per block 224 (VELEMENT = VSENSE - VSENSE1). In block 226, the voltage drop across the element, VELEMENT, is converted to a resistance value R by dividing VELEMENT by the ideal current value of 10 mA. The final step, block 228, is to multiply the element resistance value R by the previously determined current correction factor C, to correct for any error in the regulated current value of 10 mA. The subroutine is exited at block 229.

Using the illustrative example, let the operation of FIGS. 8 to 10 again be reviewed. Assume that a VSENSE1 voltage of 1.05 V is measured when block 208 of FIG. 9 is executed. Assume further that during the execution of block 212 of FIG. 9, a VSENSE2 voltage of 4.11 V is measured. The constant current calibration factor C is then given by $$C = \frac{10 \text{ mA } RNOMINAL}{VSENSE2 - VSENSE1} = \frac{10 \text{ mA } 300 \text{ ohms}}{4.11 - 1.05}$$
$$= \frac{3}{3.06} = 0.9804$$

(It is noted that for this example $$I_{10 \text{ mA}} = \frac{VSENSE2 - VSENSE1}{RNOMINAL} = \frac{4.11 - 1.05}{300} = 10.2 \text{ mA};$$

that is the actual measurement current is 10.2 mA, not 10 mA, ie. 2% higher than we might expect.) This calibration constant C of 0.9804 is stored in RAM 64 at block 218 of FIG. 9.

For the illustrative example, a case is considered where only five printed 'marks' would be required for the first printed row of an image. So although 318 resistive elements will be measured and stored in RAM at the exit 188 to FIGS. 7A, 7B, for simplicity only the resistances shall be considered of the five elements which are going to be used in the printing operation. For example, once the iterative loop commencing at block 171 has progressed to reach element number 23, suppose a value is measured in block 222 of FIG. 10 equal to a resistance of 291 ohms. After this value is multiplied by the calibration constant C of 0.9804 in block 228 an answer of 285 ohms is obtained. In block 172 the BURN TIME is determined for element 23 by using this measured resistance of 285 ohms; the required energy of 1.50 millijoules from TABLE 1; and the measured printhead voltage VHEAD$^2$ previously stored in RAM 64 which for this example equals (17.6 volts)$^2$, then $$T(\text{msec}) = \frac{E}{V^2} R = \frac{1.50}{(17.6)^2} 285$$
$$= 1.38 \text{ msec}.$$

Block 174 computes the number of "BURN INCREMENT COUNTS" N which can be contained within the calculated 1.38 msec.

$$N = \frac{T}{dt} = \frac{1.38 \text{ msec}}{0.071 \text{ msec}} = 19.44,$$

which is rounded down to 19. This value of N is then stored in the BURN TIME TABLE in the position reserved for element 23.

TABLE 2 (FIG. 19) lists the required BURN INCREMENT COUNTS for each of the five elements under consideration using the required energies of TABLE 1.

Since for the illustrative example, a case is considered where only five elements are to be printed in the first row of an image, the BURN INCREMENT COUNT for the first 22 elements will be zero and thus path 214 in FIG. 7B will be taken as the outcome of decision block 178. At element 23, a BURN INCREMENT COUNT of 19 is obviously greater than the previous maximum of zero, so the new maximum is stored at block 180. This process continues until at the EXIT 188 a value of 28 exists in the MAXIMUM BURN COUNT register in RAM memory.

Note that although all 318 printhead element resistances are measured upon the exit 188 of FIG. 7B, only five non-zero values remain in the BURN TABLE of the RAM.

Figure 11:
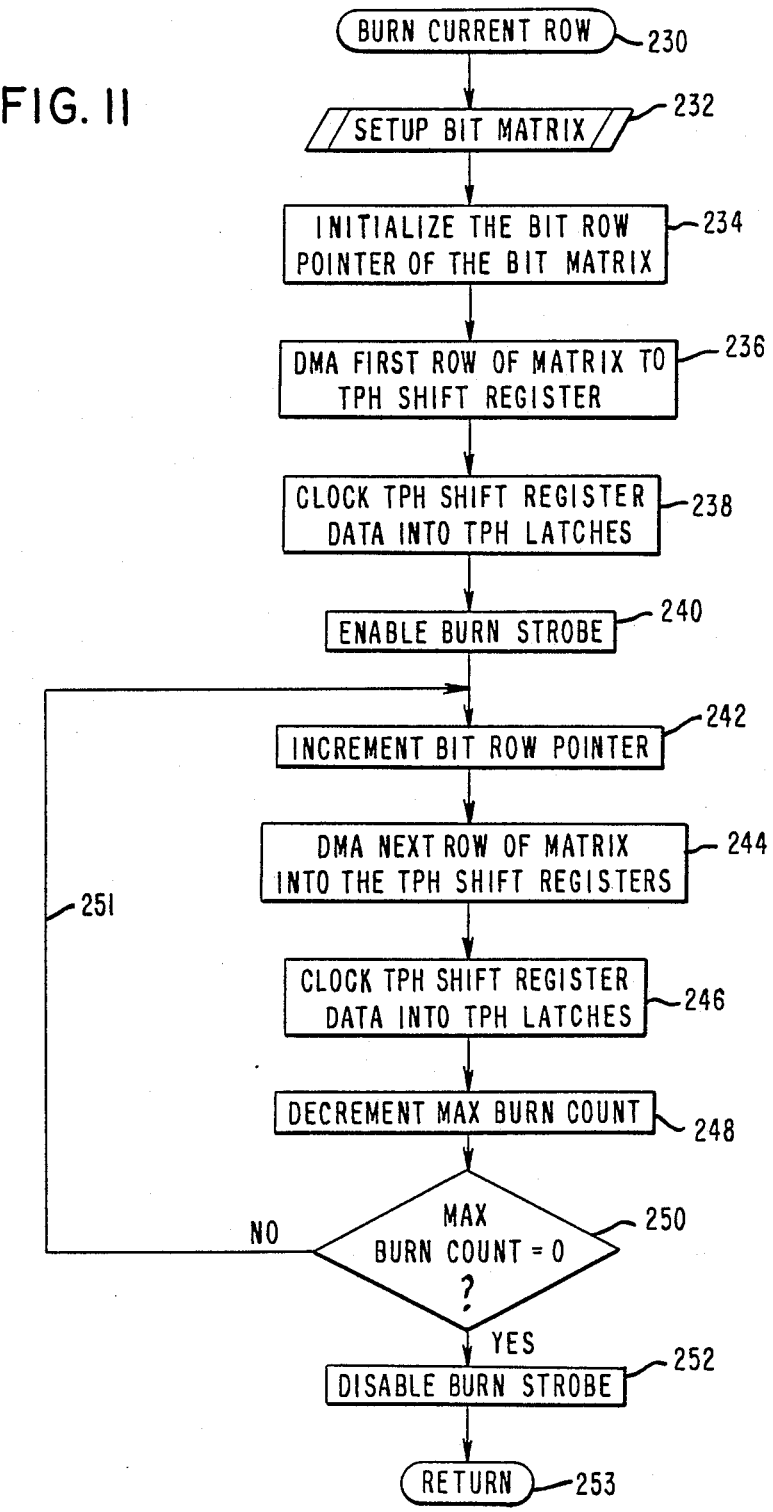
FIG. 11 is a flow diagram showing the process for effecting a thermal printing operation for a single row of dots.
Figure 12A:
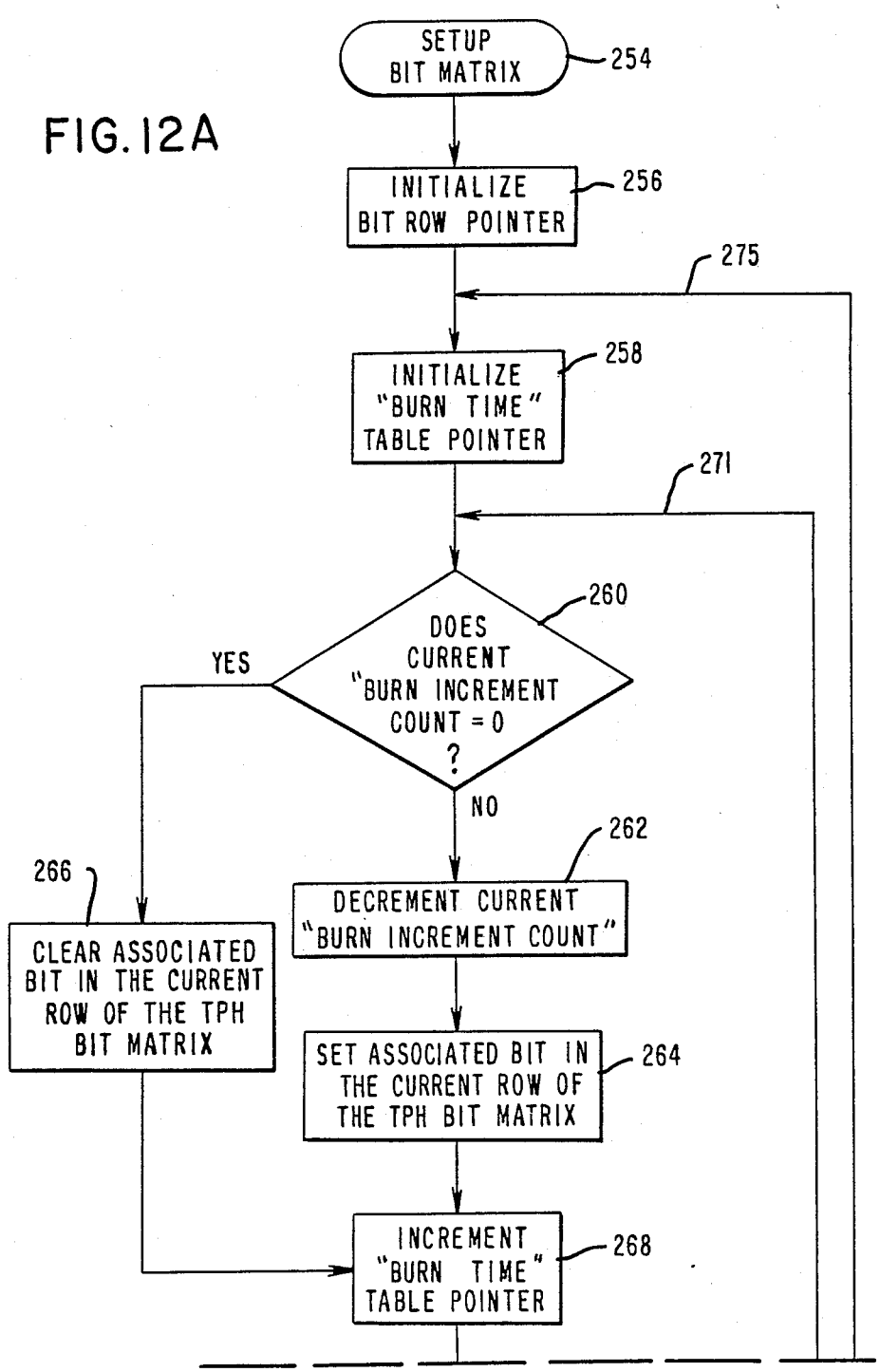
FIGS. 12A and 12B together constitute a flow diagram showing the process for setting up a matrix of bit information used to designate which elements are energized and for how long during the thermal printing operation.
Figure 12B:
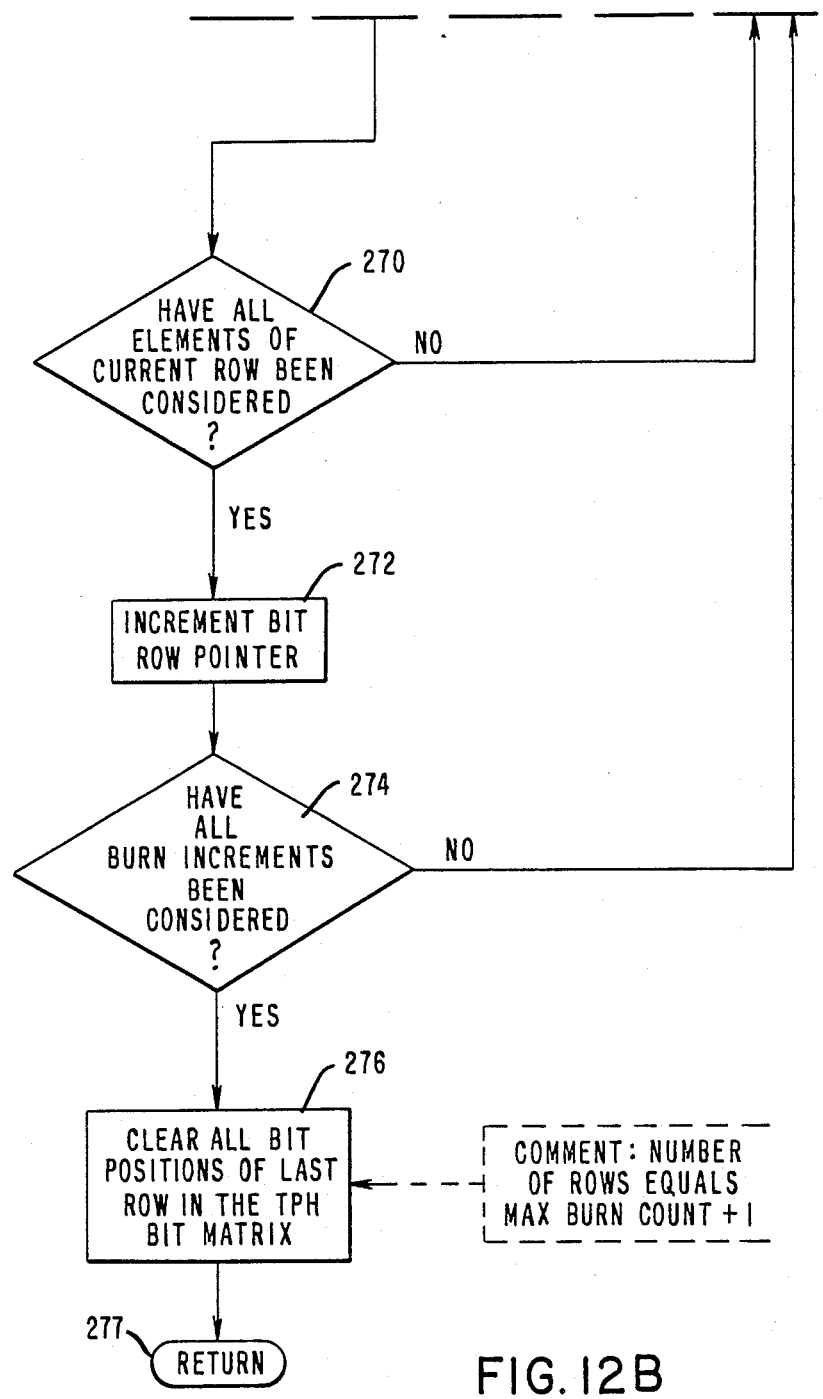

FIGS. 11, 12A and 12B, taken together, illustrate the process for burning the current row, as represented by block 150 of FIG. 6. The first step in FIG. 11, block 232, is to call the subroutine of FIGS. 12A, 12B, SETUP BIT MATRIX. This routine sets up a dynamic BIT MATRIX in RAM 64; that is, X by M bits, where X is the number of elements in the thermal print head and M is equal to the MAXIMUM BURN COUNT +1. The matrix is dynamic in that the MAXIMUM BURN COUNT can vary from one print row to the next, yielding a varying size matrix. The contents of each bit location can be either a "1" (element on) or a 0 (element OFF). The contents of this BIT MATRIX will be transmitted by direct memory access (DMA) to the printhead shift register 36 sixteen bits at a time until the entire row of X bits has been loaded. The status of each of these bits will determine whether or not the corresponding driver transistor 28, and therefore the printhead element 22 will be ON or OFF when the data is latched.

The first step of Figs. 12A, 12B is to initialize the data pointers. In block 256, the BIT ROW POINTER of the BIT MATRIX is initialized. Each row of the matrix will be X bits in length, which for the example would equal 320. In block 258 the BURN TABLE POINTER is set to the start of the BURN TIME TABLE which now contains the required number of burn count increments for each element. A determination is then made (block 260) as to whether the current "BURN INCREMENT COUNT", addressed via the BURN TABLE POINTER, equals zero. If so, the process clears the associated bit contained in the currently selected row of the BIT MATRIX (block 266). If not, the current "BURN INCREMENT COUNT" is decremented, as set forth in block 262 and the associated bit is set in the currently selected row of the BIT MATRIX (block 264). From either alternative block 266 or 264 the BURN TABLE POINTER is incremented (block 268) and then an inquiry is made as to whether all elements of the currently selected row of the BURN TIME TABLE have been considered (block 270). If NO, the process loops back over path 271 to the decision block 260. If YES, then the BIT ROW POINTER is advanced to the next row of the BIT MATRIX (block 272) and then an inquiry is made as to whether all burn increment counts of the BURN TIME TABLE have been set up (block 274). If NO, the process loops back over path 275 to reset the BURN TABLE POINTER to the start of the burn table as per block 258. If YES, one last row, in which all bit locations will be 0 (i.e. all elements turned off) is added to the BIT MATRIX (block 276). The SETUP BIT MATRIX subroutine of FIGS. 12A and 12B returns to the BURN CURRENT ROW routine of FIG. 11, as represented by block 277.

When this last row of the BIT MATRIX is loaded into the thermal print head by the process illustrated in FIG. 11, it accomplishes two things. The time taken to direct memory access the data into the TPH shift regis-
ter 36 "marks off" the basis time period of the last burn increment. The clocking of this data into the thermal print head (TPH) latches 34 turns off all of the TPH drive transistors $Q_l$-$Q_n$, ending the burn operation of the current row.

Upon completion of the process described in FIGS. 12A, 12B which was invoked by block 232 of FIG. 11, the BIT ROW POINTER is set to point to the beginning of the BIT MATRIX (block 234).

At this point, all preparations for burning a print row have been completed. The first row of the BIT MATRIX is entered by direct memory access into the TPH shift register 36 (block 236), the data in the shift register is transferred into the TPH latches 34 (block 238) and the burn strobe "TBURN" on line 32 (FIGS. 1, 2A, 2B) is enabled, as set forth in block 240. This enables the AND gates 30, which allows those gates with inputs from TPH latches 34 set to "1", to turn on their associated print elements $R_1$-$R_N$ of FIG. 1 and $R_3$-$R_N$ of FIG. 2B. Burning of the current row has begun. The process now enters into a loop consisting of blocks 242 to 250 and return path 251.

At the beginning of the loop, the BIT ROW POINTER is advanced to the start of the data for the next burn interval (block 242), the data is then entered by direct memory access into the TPH shift register 36 (block 244) and then clocked into the TPH latches 34 (block 246). At the bottom of the loop the MAX BURN COUNT register is decremented (block 248) and then tested for value zero (block 250). If not zero, the process returns to the start of the loop by path 251. If the MAX BURN COUNT register equals zero, the process then disables the burn strobe, line 32 (block 252) and then exits the burn row process.

The illustrative example will be continued in order to aid in the understanding of the operation of FIGS. 11, 12A and 12B. For the illustrative example, the first non-zero BURN INCREMENT COUNT occurs at element 23, whereupon the decision block 260 directs control to block 262 of FIG. 12A. TABLE 3 (FIG. 20) illustrates the contents of the RAM BURN TIME TABLE at entrance 230 to the routine and after all 320 element positions have been considered, for the first time, at the entrance to block 272. The loop consisting of blocks 258 to 274 with return path 275 will be repeated 28 times, after which every location in the BURN TIME TABLE will contain the value zero.

TABLE 4 (FIG. 21) shows the status of selected bit locations within selected rows of the BIT MATRIX created by the process described in FIGS. 12A, 12B. A new row of bit data is established with each pass of the loop described above (blocks 258 to 274).

Bit positions 1 and 2 will be 0 for all rows during the print operation of the preferred embodiment of FIGS. 2A and 2B since they are used to control transistors $Q_1$ and $Q_2$ which are used in determining the current calibration factor C.

Each row of 320 bits of the BIT MATRIX is then entered by direct memory access (DMA) into the TPH shift register 36, sixteen bits at a time via parallel-to-serial shift registers 46. The total DMA time for each row sets the basis burn increment of 0.071 millisecond as previously described $$\left( \frac{320 \text{ bits}}{4.5 \text{ MHz}} = 0.071 \text{ millisecond} \right)$$

After each successive row of bit data from the BIT MATRIX is entered sixteen bits at a time by direct memory access (DMA), the data is transferred from the TPH shift register 36 to the thermal print head latches 34.

Figure 15:
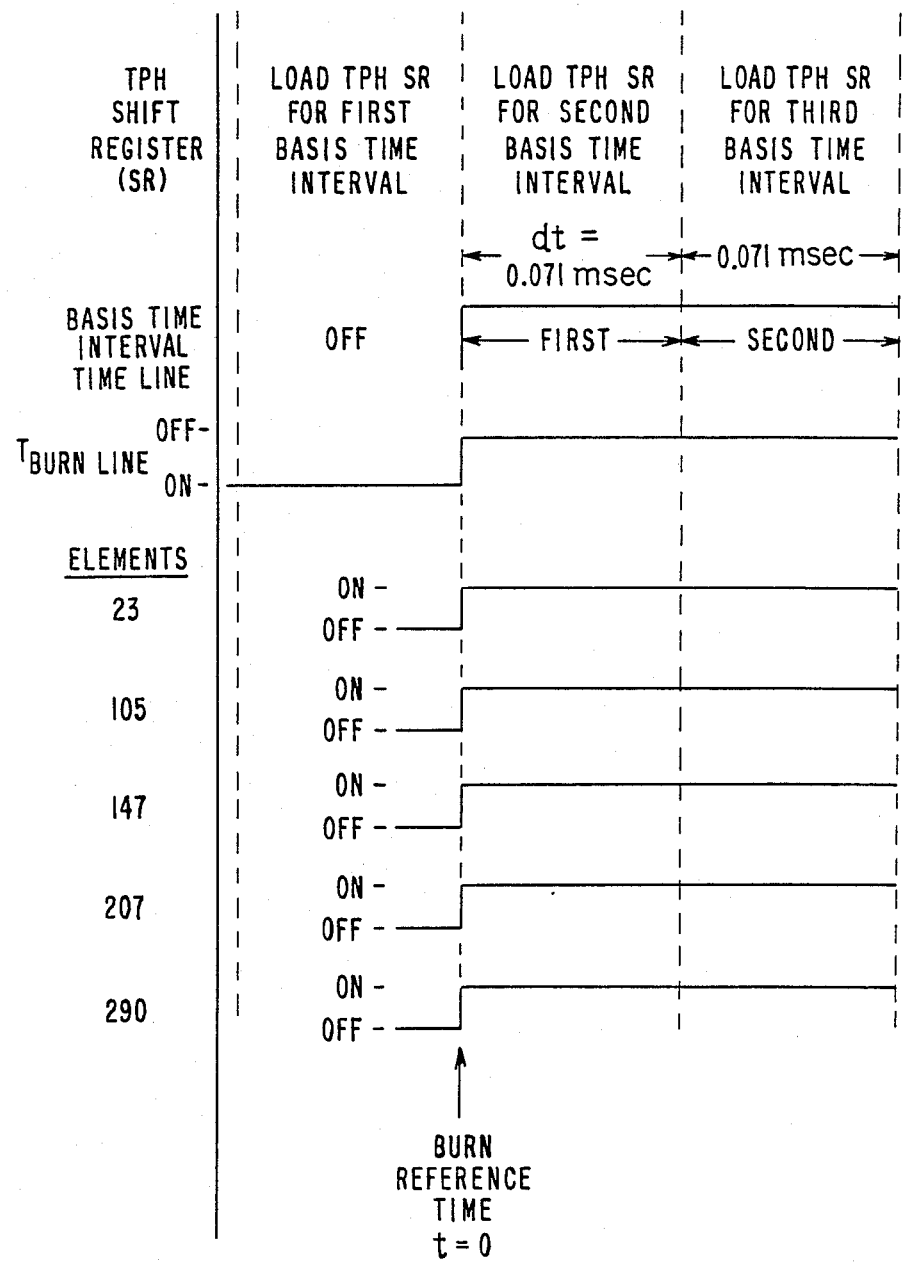
FIG. 15 illustrates the operation of five exemplary elements after completion of the second interval time during a printing operation.

Following transfer of the first row of bit data into the latches 34, the burn line "TBURN" (line 32) is activated, starting the burn operation. This means that electrical current starts to flow through print head elements 23, 105, 147, 207 and 290. FIG. 15 illustrates the sequence up to the end of the second time interval.

At the output of block 246 after the seventeenth pass, element 290 has reached the end of its burn period and is turned off. This operation has been dictated by the contents of the BIT MATRIX as illustrated in TABLE 4 of FIG. 21.

Figure 16:
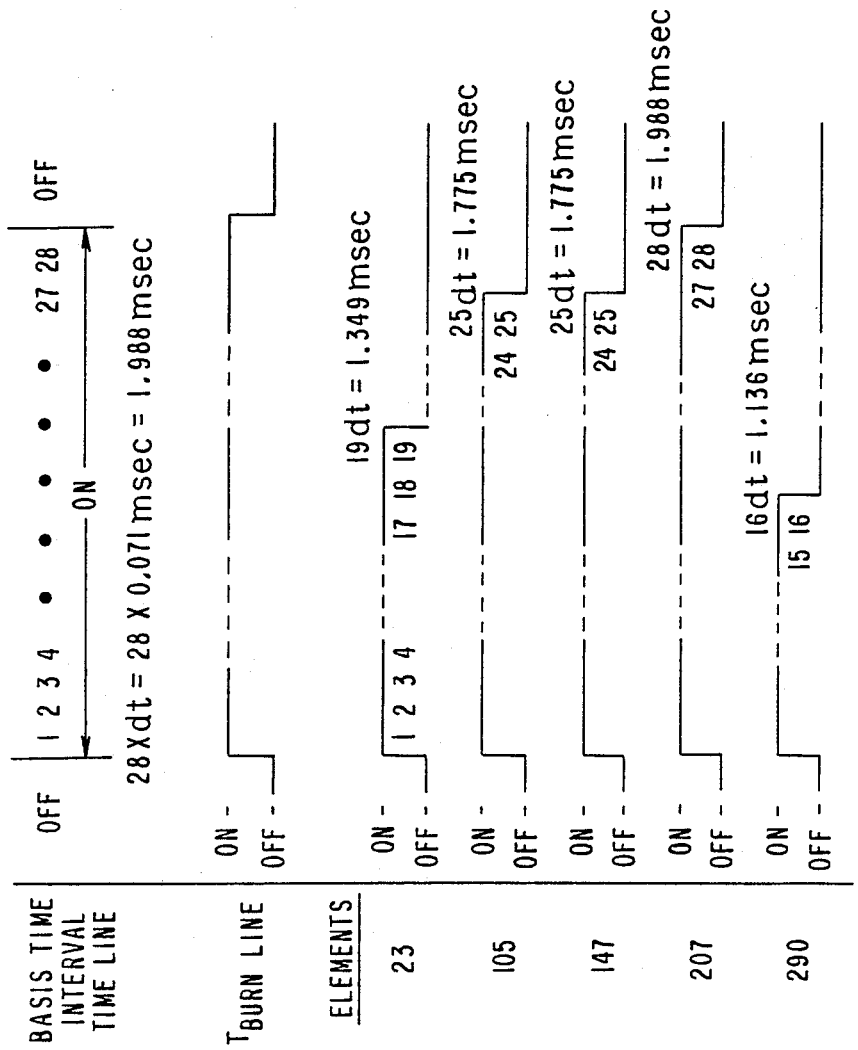
FIG. 16 illustrates the operation of five exemplary elements after the maximum burn count register has expired.

As TABLE 4 in FIG. 21 shows, the last row of bit data in the BIT MATRIX consists entirely of zeros. The transferring by direct memory access of this data into the TPH shift register 36, marks off the burn time of the bit data from row 28 of the BIT MATRIX. The transfer of this last row of data into the TPH latches 34 marks the end of the current burn operation. FIG. 16 illustrates the overall timing sequence effected by the "BURN CURRENT ROW" subroutine.

Figure 17:
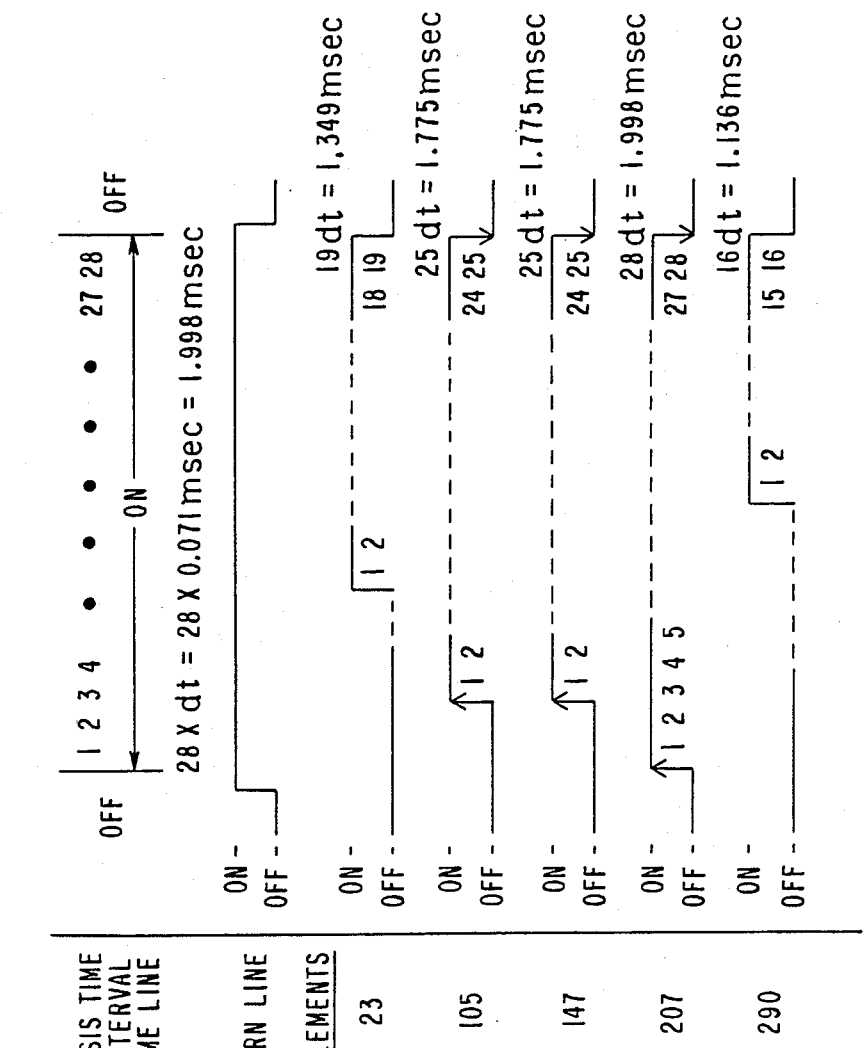
FIGS. 17 and 18 illustrate different possible operations of the thermal print head elements under different types of control.
Figure 18:
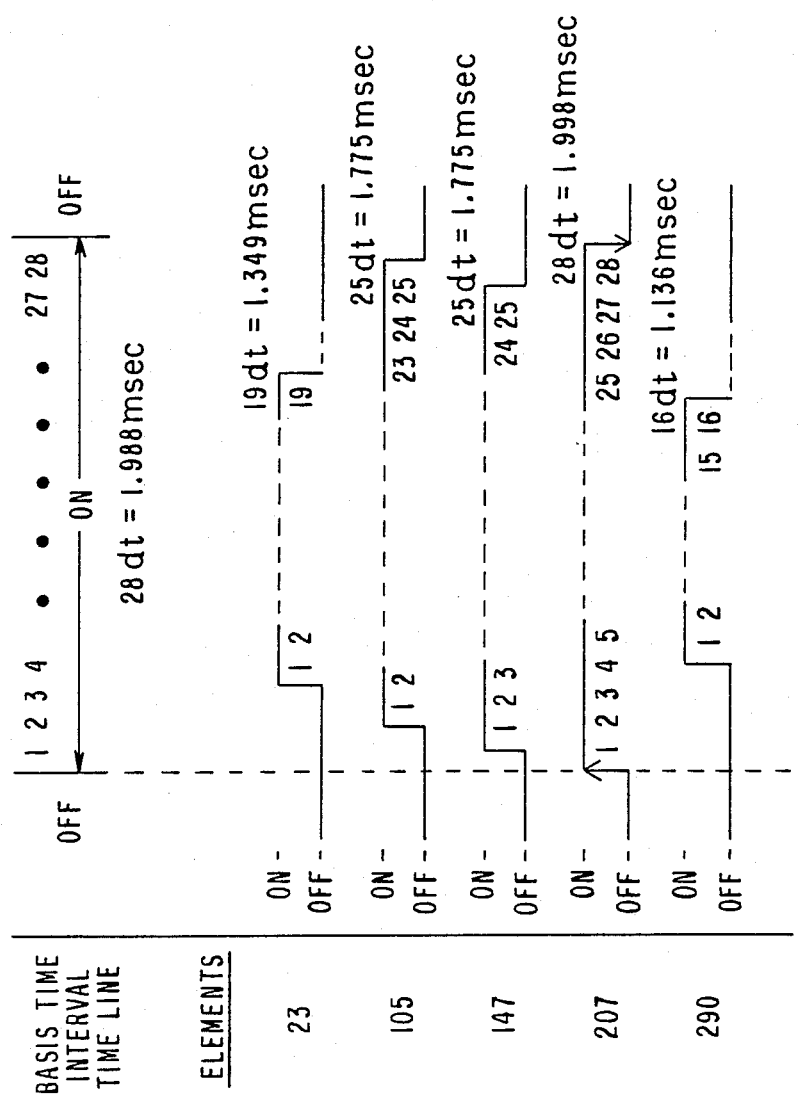

While the foregoing description as summarized by FIG. 16 has the electrical current for all the active print head elements starting at the same time, it should be recognized that trivial changes to the control software would permit the burn pulses to (a) start at different times and all end at the same time, as illustrated in FIG. 17, or (b) start and end at different times, not exceeding, however, the maximum burn count, as illustrated in FIG. 18. Approaches such as these may be beneficial in allowing certain resistive elements longer or shorter times to cool or may be useful in the timing of the application of a mark on a record medium or may be useful in optimizing the total power which is dissipated in the thermal printhead at any one time.

While the foregoing description sets forth a preferred embodiment of the invention, it will be understood by those skilled in the art that various modifications may be made within the spirit of the invention and the scope of the appended claims. For example, the implementation described herein employing the parallel-to-serial shift register 46 is but one of several possible approaches to enable the rapid loading and reloading of the thermal print head shift register 36.

Other approaches which would fully utilize the DMA feature of the processor 62 would include the loading of the entire printing row information or even entire image information for all time periods into dual port dynamic NMOS video random access memory such as the uPD41264-12, as manufactured by NEC Electronics Inc., Mountain View, California, or the TMS4161, as manufactured by Texas Instruments Inc., Dallas, Texas, and by American Telephone and Telegraph Co. The dual port architecture of these chips, with their fast, on-chip output registers, allows the system easily to support serial transfer rates of 25 MHZ. The information can then be shifted out to the thermal print head 20 serially, independent of the operation of the processor 62. Where coarser time burn incremental durations (dt) are adequate, it is not necessary to utilize the direct memory access (DMA) feature of the processor 62, and data can be obtained directly from the data bus 72. Specialized integrated circuits such as the 2952 telecom line conditioning controller manufactured by Intel Corporation, Santa Clara, California, used with a 4.096 MHZ serial bus, might also be considered as the link between the processor 62 and the thermal print head register 36.

For example, the control software of FIG. 6 might be modified to accomplish blocks 142 and 144 in parallel with block 150 with no deleterious effect on the operation of the system.

Further embodiments may also incorporate the techniques whereby defective printhead elements may be determined, and the printed image modified accordingly, as set forth in copending U.S. patent application Ser. No. 640,894, Ralf Brooks et al., inventors, filed Aug. 14, 1984, now U.S. Pat. No. 4,595,935, issrued June 17, 1986 assigned to the assignee of the present application.

It will be noted that the illustrated embodiment of the invention has accomplished burn times customized for each element 22 in the thermal print head 20 by rapid updates of the contents of the shift register 36. An alternative embodiment might employ a conceptual organization in which the thermal print head element resistances are measured as previously described; the resistances within the thermal print head are placed into "groups", in which each group covers a specific resistance range; and a sequential series of burn pulses is then applied to a TBURN line, with each burn pulse being customized for each resistance grouping. This approach would be considerably slower than the preferred embodiment previously described, because system operation would be essentially serial, rather than parallel, in nature.

While the use of this invention for grey scale printing has been mentioned above, the invention may also be employed for color printing, using color-reaction thermal transfer ribbons which allow graduated color shades as a function of element energy. Combining four such basic ribbons, such as cyan, yellow, magneta and black, will provide color shaded images. The dual port dynamic video RAM can be effectively used in this particular application.

What is claimed is:

1. Thermal printing apparatus comprising, in combination:

thermal print head means including a plurality of thermal elements and circuit means for applying required energy to and controlling the individual operation of said elements;

means connected with said thermal print head means for providing a head voltage value thereto;

means connected with said thermal print head means for measuring the resistance of each individual thermal element and providing a digital value representing each such resistance;

data input means for selection of individual thermal elements to be energized;

processing means for computing individual thermal element burn duration values in accordance with which elements are selected by the data input means, and also in accordance with the measured digital resistance values of each such element taken from said measuring means, the required energy and the head voltage value;

storage means for storing the computed individual element burn duration values for said elements;

parallel-to-serial shift register means for receiving data in parallel form from said storage means under control of said processing means relating to which elements are to be energized and for what duration, and for providing said data in serial form to said circuit means of said thermal print head means for selection and timed operation of each of said thermal elements;

interface circuitry means for providing operating signals to said thermal print head means; and bus means interconnecting said measuring means, said data input means, said processing means, said storage means, said interface circuitry means and said parallel-to-serial shift register means for communications.

2. The apparatus of claim 1 in which the means for measuring the resistance of each individual thermal element and providing a digital value representing each resistance comprises means for measuring the total voltage drop of a circuit which includes said individual thermal element, means for digitizing such total voltage drop, and means for subtracting from said digitized total voltage drop a predetermined digital value representing voltage drops across other components in said circuit to obtain the voltage drop across said individual thermal element, which bears a linear relationship to the resistance of said individual thermal element.

3. The apparatus of claim 1 in which the means for measuring the resistance of each individual thermal element and providing a digital value representing each such resistance comprises interconnected means for measuring the total voltage drop of a circuit which includes said individual thermal element, means for digitizing said total voltage drop taken from said measuring means, means for measuring the voltage drop across other compponents in said circuit, means for digitizing said voltage drop across said other components, means for subtracting said digitized voltage drop for said other components from said digitized total voltage drop to provide the voltage drop across said individual thermal element, means for determining a correction factor to eliminate inaccuracies arising from imprecise current regulation, and means for multiplying the voltage drop across the individual thermal element by said correction factor to produce a digitized representation of the resistance of said individual thermal element, and in which the means for providing a head voltage value includes measuring and digitizing means.

4. The thermal printing apparatus of claim 1 in which the transfer of data from said storage means to said parallel-to-serial shift register means under control of said processing means is by direct memory access.

5. Thermal printing apparatus comprising, in combination:

a thermal print head comprising a plurality of thermal elements;

energizing means connected with said thermal print head for applying required energy to said thermal elements for printing;

means connected with said thermal print head for providing a head voltage value for the thermal print head;

thermal print head shift register means for receiving individual thermal element energization data in serial form;

latch means connected with said thermal print head shift register means for receiving thermal element energization data in parallel form from said thermal print head shift register means;

switching means connected with and controlled by said latch means for controlling energization of said thermal elements of said thermal print head;

means for measuring the resistance of each individual thermal element and providing a digital value representing each such resistance;

data input means for selection of individual thermal elements to be energized;

data processing means for computing individual thermal element burn duration values in accordance with which elements are selected by the data input means and in accordance with the measured digital resistance values of each such element taken from said measuring means, the required energy and the head voltage value;

storage means for storing the computed individual element burn duration values for each of said elements;

parallel-to-serial storage means for receiving data in parallel form from said storage means under control of said data processing means relating to which elements are to be energized and for what duration and for providing individual thermal element energization data in serial form to said thermal print head shift register means;

interface circuitry means for providing operating signals to said thermal print head shift register means, to said latch means and to said switching means; and bus means interconnecting said measuring means, said data input means, said data processing means, said storage means, said interface circuitry means and said parallel-to-serial storage means for communications.

6. The thermal printing apparatus of claim 5 in which the computed individual element burn duration values are transmitted in parallel from said data processing means to said storage means.

7. The thermal printing apparatus of claim 5 in which the data processing means includes at least one direct memory access channel, and controller means, which control the transmission of information from the storage means to the parallel-to-serial shift register means.

8. The thermal printing apparatus of claim 5, also including means for selectively varying the standard gray scale shade of marks produced in printing by said thermal printing apparatus.

9. The thermal printing apparatus of claim 5, in which said data processing means is a microprocessor.

10. The thermal printing apparatus of claim 5, in which said storage means is a random access memory.

11. The thermal printing apparatus of claim 5, in which said converting means is an analog-to-digital converter.

12. The thermal printing apparatus of claim 5, in which said parallel-to-serial storage means is a parallel-to-serial shift register.

13. The thermal printing apparatus of claim 5 in which the transfer of data from said storage means to said parallel-to-serial storage means under control of said data processing means is by high-speed data transfer means.

14. The thermal printing apparatus of claim 5 in which the computed individual thermal element burn duration values take the form of a count of burn increments, each burn increment being of predetermined duration.

15. The thermal printing apparatus of claim 5 in which the means for measuring the resistance of each individual thermal element and providing a digital value representing each such resistance comprises interconnected means for measuring the total voltage drop of a circuit which includes said individual thermal element, means for digitizing such total voltage drop, and means for subtracting from said digitized total voltage drop a predetermined digital value representing voltage drops across other components in said circuit to obtain the voltage drop across said individual thermal element, which bears a linear relationship to the resistance of said individual thermal element.

16. The thermal printing apparatus of claim 5 in which the means for providing a head voltage value comprises a first amplifier connected with the thermal print head, a resistance divider network connected with said first amplifier, a unity gain operational amplifier connected with said network, and an analog-to-again converter connected with said unity gain operational amplier and said data processing means.

17. The thermal printing apparatus of claim 5 in which means for measuring the resistance of each individual thermal element and providing a digital value representing each such resistance comprises interconnected means for measuring the total voltage drop of a circuit which includes said individual thermal element, means for digitizing said total voltage drop, means for measuring the voltage drop across other components in said circuit, means for digitizing said voltage drop across said other components, means for subtracting said digitized voltage drop for said other components from said digitized total voltage drop to provide the voltage drop across said individual thermal element, means for determining a correction factor to eliminate inaccuracies arising from imprecise current regulations and means for multiplying the voltage drop across the individual thermal element by said correction factor to produce a digitized representation of the resistance of said individual thermal element; and in which the means for providing a head voltage value includes measuring and digitizing means.

18. The thermal printing apparatus of claim 17 in which said means for determining a correction factor comprises a calibrated resistance.

19. A method of thermal recording, said method utilizing a thermal print head including a plurality of individual thermal elements and operating circuitry for applying required energy and causing activation of said elements, comprising the steps of;
  determining the common applied voltage to said thermal elements;
  determining the resistance of each individual thermal element;
  determining from said resistance, said required energy, and said common applied voltage the length of time, hereinafter referred to as burn time, that each individual thermal element must be energized in order to produce a record having markings of desired shades;
  storing the individual burn time information for each thermal element in a storage means;
  transferring the individual burn time information from said storage means to said operating circuitry of said thermal print head; and
  causing the operation of said thermal print head, whereby said thermal elements are energized for various durations in accordance with their individual resistances, said required energy and said common applied voltage.

20. The method of claim 19 in which the thermal recording is performed row by row, and in which all of said steps are repeated for recording of each row.

21. The method of claim 19 in which the durations of activation of the thermal elements are measured in increments of predetermined duration.

22. The method of claim 19 in which the step of transferring burn time information comprises a first step of transferring said burn time information in parallel mode from said storage means to a parallel-to-serial shift register means, and a second step of transferring said burn time information from said parallel-to-serial shift register in a serial mode to said operating circuitry of said thermal print head.

23. The method of claim 19 in which the step of transferring burn time information employs direct memory access.

24. The method of claim 19 in which the step of determining the length of time that each thermal element must be activated is accomplished in accordance with the equation $T=(E/V^2)R$, in which T represents burn time, E represents the desired energy input to a thermal element, V represents the common applied voltage, and R represents the measured resistance.

25. The method of claim 19 in which the step of determining the resistance of each individual thermal element includes the following steps:
  measuring the total voltage drop of a circuit which includes said individual thermal element;
  digitizing said total voltage drop; and
  subtracting from said digitized total voltage drop a predetermined digital value representing voltage drops across other components in said circuit to obtain the voltage drop across said individual thermal element, which bears a linear relationship to the resistance of said individual thermal element.

26. The method of claim 19 in which the step of determining the resistance of each individual thermal element includes the following steps;
  measuring the total voltage drop of a circuit which includes said individual thermal element;
  digitizing said total voltage drop;
  measuring the voltage drop across other components in said circuit;
  digitizing said voltage drop across said other components;
  subtracting said digitized voltage drop for said other components from said digitized total voltage drop to provide the voltage drop across said individual thermal element;
  determining a correction factor to eliminate inaccuracies arising from imprecise current regulation; and
  multiplying the voltage drop across the individual thermal element by said correction factor to produce a digitized representation of the resistance of said individual thermal element.

27. The method of claim 19 in which activation of individual burn times of the thermal elements can be initiated at different times.

28. The method of claim 19 in which the step of determining burn time includes computations to produce desired optical density shade variations in the markings produced by the thermal print head on a record medium.

29. The method of claim 28 in which the modification of the step of determining burn time includes a step of multiplying a burn time value by an optical density shade value.

* * * * *

UNITED STATES PATENT AND TRADEMARK OFFICE
CERTIFICATE OF CORRECTION

PATENT NO. : 4,758,966
DATED : July 19, 1988
INVENTOR(S) : Ralf Brooks et al.

It is certified that error appears in the above-identified patent and that said Letters Patent is hereby corrected as shown below:

Column 21, line 40, delete "compponents" and substitute --components--.

Column 23, line 26, delete "analog-to-again" and substitute --analog-to-digital--.

Column 23, line 28, delete "amplier" and substitute --amplifier--.

Column 23, line 43, delete "regulations" and substitute --regulation,--.

Signed and Sealed this

Twentieth Day of December, 1988

Attest:

DONALD J. QUIGG

Attesting Officer

Commissioner of Patents and Trademarks